United States Patent
Fukushima et al.

(10) Patent No.: US 8,687,273 B2
(45) Date of Patent: Apr. 1, 2014

(54) IMAGE DISPLAY DEVICE, ELECTRONIC DEVICE, AND PARALLAX BARRIER ELEMENT

(75) Inventors: Hiroshi Fukushima, Yamatokoriyama (JP); Koji Yabuta, Kashiba (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 599 days.

(21) Appl. No.: 12/440,146

(22) PCT Filed: Sep. 6, 2007

(86) PCT No.: PCT/JP2007/067434
§ 371 (c)(1),
(2), (4) Date: Mar. 5, 2009

(87) PCT Pub. No.: WO2008/029891
PCT Pub. Date: Mar. 13, 2008

(65) Prior Publication Data
US 2010/0182686 A1    Jul. 22, 2010

(51) Int. Cl.
*G02B 27/22* (2006.01)
*H04N 13/04* (2006.01)

(52) U.S. Cl.
USPC ............. 359/463; 359/464; 359/462; 348/56; 348/59

(58) Field of Classification Search
USPC ............ 359/463, 462, 622, 621, 464; 348/56, 348/59
See application file for complete search history.

(56) References Cited

U.S. PATENT DOCUMENTS 4,404,471 A    9/1983    Winnek et al.
4,957,351 A    9/1990    Shioji
5,579,164 A *  11/1996   Chapnik ........................ 359/618
5,663,831 A    9/1997    Mashitani et al.
5,666,226 A    9/1997    Ezra et al.
5,969,850 A    10/1999   Harrold et al.
6,049,424 A    4/2000    Hamagishi
6,204,967 B1   3/2001    Morishima et al.
6,215,594 B1   4/2001    Inoguchi et al.

(Continued)

FOREIGN PATENT DOCUMENTS

EP    1 185 113 A2    3/2002
GB    2 278 222 A     11/1994

(Continued)

OTHER PUBLICATIONS

International Search Report for PCT/JP2007/067434, mailed Dec. 11, 2007.

(Continued)

*Primary Examiner* — Audrey Y Chang
(74) *Attorney, Agent, or Firm* — Nixon & Vanderhye P.C.

(57) ABSTRACT

In an image display device having a parallax barrier element, a bright display with a broad viewing range can be realized. The image display device according to the present invention includes: a display panel having a first group of pixels for displaying a first image and a second group of pixels for displaying a second image; and a parallax barrier element for separating display light emitted from the first group of pixels and display light emitted from the second group of pixels, the parallax barrier element including a plurality of light-shielding portions and a plurality of light-transmitting portions which are alternately positioned within the same plane. The parallax barrier element includes converging elements respectively provided for the plurality of light-transmitting portions.

10 Claims, 22 Drawing Sheets

(56) References Cited

U.S. PATENT DOCUMENTS

| | | | |
|---|---|---|---|
| 6,297,911 B1 | 10/2001 | Nishikawa et al. | |
| 6,302,541 B1* | 10/2001 | Grossmann | 351/240 |
| 6,822,799 B2* | 11/2004 | Kitamura et al. | 359/622 |
| 7,009,340 B2* | 3/2006 | Asai et al. | 313/512 |
| 7,050,020 B2* | 5/2006 | Uehara et al. | 345/6 |
| 7,139,042 B2 | 11/2006 | Nam et al. | |
| 7,199,845 B2 | 4/2007 | Koyama et al. | |
| 7,355,339 B2* | 4/2008 | Okinaka et al. | 313/504 |
| 2003/0107805 A1 | 6/2003 | Street | |
| 2003/0137620 A1 | 7/2003 | Wang et al. | |
| 2003/0214459 A1 | 11/2003 | Nishihara et al. | |
| 2004/0119896 A1 | 6/2004 | Kean et al. | |
| 2004/0196560 A1 | 10/2004 | Nagasawa et al. | |
| 2005/0073577 A1 | 4/2005 | Sudo et al. | |
| 2005/0111100 A1* | 5/2005 | Mather et al. | 359/464 |
| 2005/0200781 A1 | 9/2005 | Takatani | |
| 2006/0152812 A1 | 7/2006 | Woodgate et al. | |
| 2006/0238863 A1 | 10/2006 | Saishu | |
| 2007/0058127 A1 | 3/2007 | Mather et al. | |
| 2007/0058258 A1 | 3/2007 | Mather et al. | |

FOREIGN PATENT DOCUMENTS

| | | |
|---|---|---|
| GB | 2 405 519 | 3/2005 |
| GB | 2 405 542 | 3/2005 |
| GB | 2 405 543 A | 3/2005 |
| GB | 2 428 129 | 1/2007 |
| JP | 3-119889 A | 5/1991 |
| JP | 3-230699 | 10/1991 |
| JP | 7-104212 | 4/1995 |
| JP | 10-268230 | 10/1998 |
| JP | 11-331876 A | 11/1999 |
| JP | 2000-36927 A | 2/2000 |
| JP | 2005-122020 | 5/2005 |
| WO | WO 99/09750 | 2/1999 |

OTHER PUBLICATIONS

Office Action mailed Jul. 21, 2009 in corresponding U.S. Appl. No. 11/365,813.
Final Office Action mailed Mar. 17, 2010 in corresponding U.S. Appl. No. 11/365,813.
English translation of the International Preliminary Report on Patentability mailed Mar. 26, 2009 in corresponding PCT Application No. PCT/JP2007//067434.
Office Action mailed May 20, 2008 in co-pending U.S. Appl. No. 11/223,206.
U.S. Office Action mailed Mar. 22, 2007 in corresponding U.S. Appl. No. 11/365,813.
U.S. Final Office Action mailed Sep. 25, 2007 in corresponding U.S. Appl. No. 11/365,813.
Chinese Office Action and English translation thereof, mailed Jun. 9, 2006 in corresponding Chinese application 200410089918.4.
U.S. Office Action mailed Oct. 22, 2007 in corresponding U.S. Appl. No. 11/223,206.
Supplementary European Search Report dated Nov. 18, 2010 in EP Application 07806875.6.

* cited by examiner

FIG.31
(a) 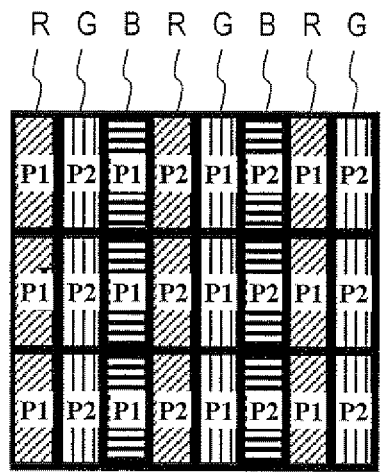
(b) 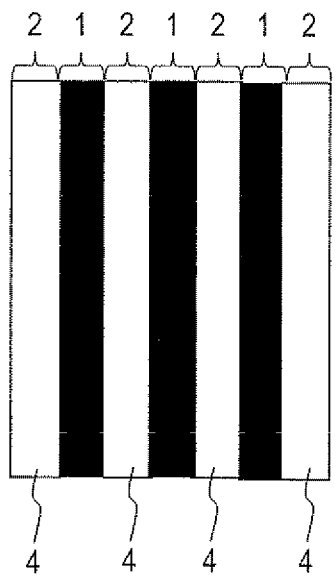
(c) 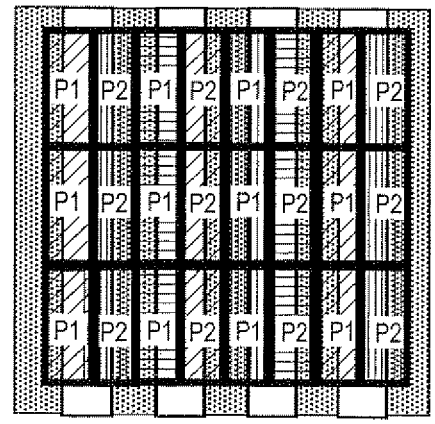

*FIG.32*
(a) 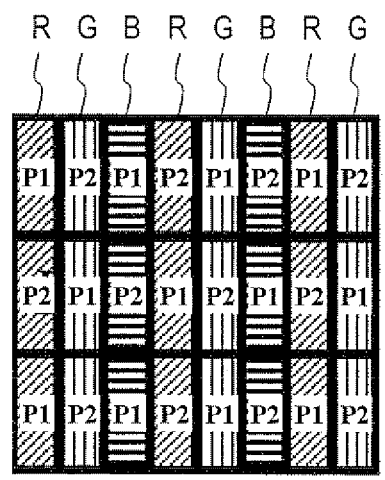
(b) 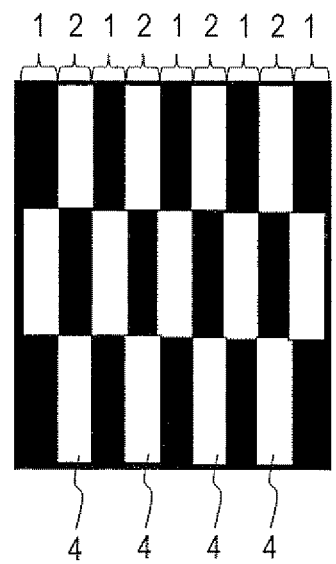
(c) 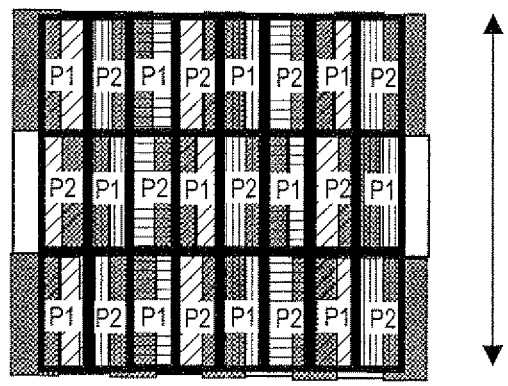

FIG.37
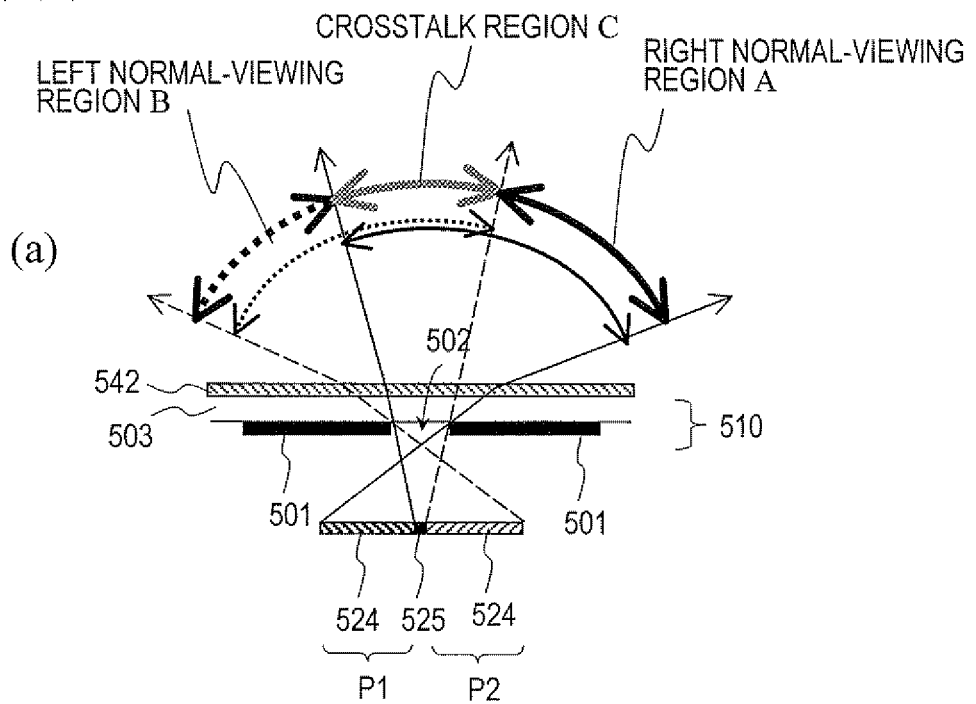
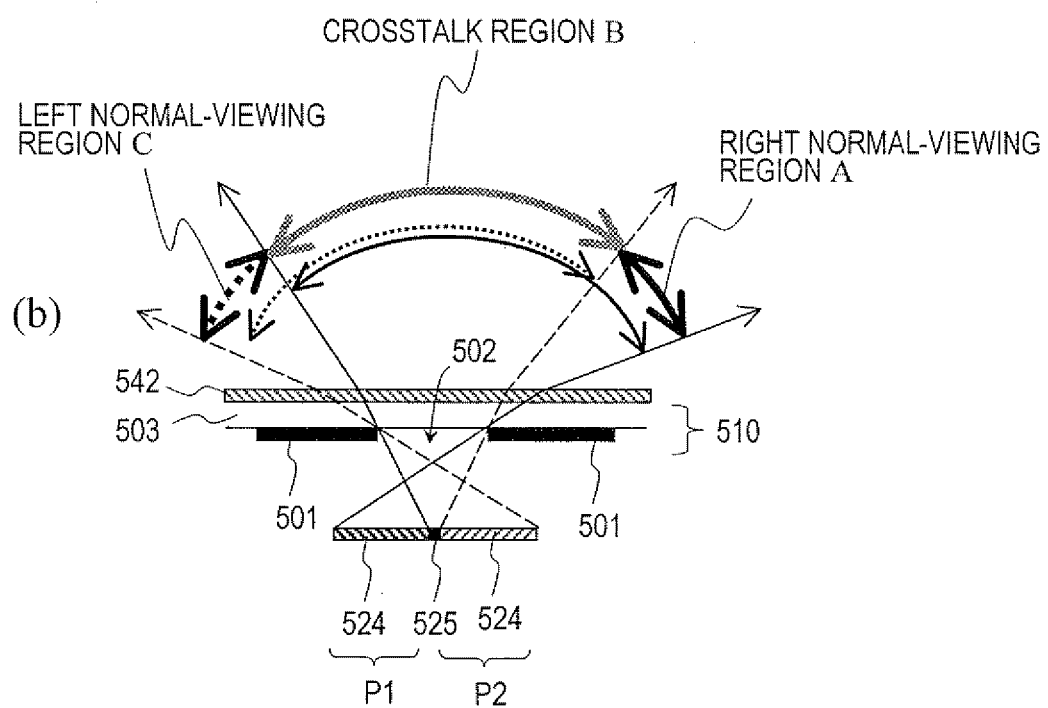

IMAGE DISPLAY DEVICE, ELECTRONIC DEVICE, AND PARALLAX BARRIER ELEMENT

This application is the U.S. national phase of International Application No. PCT/JP2007/067434, filed 6 Sep. 2007, which designated the U.S. and claims priority to Japan Application No. 2006-243348, filed 7 Sep. 2006, the entire contents of each of which are hereby incorporated by reference.

TECHNICAL FIELD

The present invention relates to an image display device, and more particularly to an image display device having a parallax barrier element.

BACKGROUND ART

One representative method of displaying a stereoscopic image by using an image display device which displays two-dimensional images is a parallax barrier system. A parallax barrier system is a system in which a zone (barrier) having alternating light-shielding portions and light-transmitting portions is provided on the front face or the rear face of an image display device, such that stereoscopy is realized by observing the display surface through the barrier.

Patent Document 1 discloses a stereoscopic image display device having a parallax barrier element on the viewer's side of a liquid crystal display panel.

FIG. 35 schematically shows an image display device 400 disclosed in Patent Document 1. As shown in FIG. 35, the image display device 400 includes, from the viewer's side, a parallax barrier element 410, a liquid crystal display panel 420, and a backlight 430. The liquid crystal display panel 420 has a construction such that a liquid crystal layer 423 is interposed between a pair of glass substrates 421 and 422 having electrodes and wiring lines for driving, thin film transistors (TFTs), color filters, and the like. On a light-entering face and a light-outgoing face of the liquid crystal display panel 420, polarizers (not shown) are respectively provided. The liquid crystal display panel 420 has a plurality of pixels, and by applying a voltage across the liquid crystal layer 423 in each pixel, the polarization state of light is changed, thus performing display.

The liquid crystal display panel 420 displays an image for the left eye in pixels indicated with the letter "left" in FIG. 35, and an image for the right eye in pixels indicated with the letter "right". Since the parallax barrier element 410 blocks light from the liquid crystal display panel 420 in its light-shielding portions, the images from the liquid crystal display panel 420 are observed by the viewer only through the light-transmitting portions of the parallax barrier element 410. At this time, by appropriately setting the pattern and positioning of the parallax barrier element 410, the right eye of the viewer is allowed to only see the image which is displayed by the "right" pixels, and the left eye is allowed to only see the image which is displayed by the "left" pixels. Since a parallax is conferred to the images that are displayed by the "left" pixels and the "right" pixels, the viewer can experience stereoscopy.

In recent years, image display devices have been proposed which allow a plurality of viewers to view respectively different images by using a parallax barrier element. Such image display devices may also be referred to as "dual-view display devices". Whereas a stereoscopic image display device allows the right eye and the left eye of a single viewer to view different images, a dual-view display device allows a plurality of viewers to view respectively different images. In other words, a dual-view display device separates images at positions which are farther away than in a stereoscopic image device (i.e., at greater angles). Very simply said, a dual-view display device is obtained by reducing the distance between the parallax barrier element and the pixels in a stereoscopic image display device.

An example of a dual-view display device is shown in FIG. 36. A dual-view display device 500 shown in FIG. 36 includes a parallax barrier element 510, a liquid crystal display panel 520, and a backlight 530.

The liquid crystal display panel 520 includes an active matrix substrate 521, a color filter substrate 522, and a liquid crystal layer 523 interposed therebetween. On the active matrix substrate 521, pixel electrodes and TFTs (not shown) are provided. On the color filter substrate 522, color filters 524 and a black matrix 525 are provided.

The parallax barrier element 510 includes a plurality of light-shielding portions 501 and a plurality of light-transmitting portions 502 alternating on the glass substrate 503. The parallax barrier element 510 is directly attached to the color filter substrate 522 of the liquid crystal display panel 520 via a resin layer 505, whereby the distance between the parallax barrier element 510 and the pixels (color filters 524) is reduced.

A pair of polarizers 541 and 542 are provided, on the backlight 530 side of the active matrix substrate 521 and the viewer's side of the glass substrate 503 of the parallax barrier element 510.

The liquid crystal display panel 520 has a first group of pixels for displaying a first image and a second group of pixels for displaying a second image. As the display light emitted from the first group of pixels and the display light emitted from the second group of pixels are separated by the parallax barrier element 510, a plurality of viewers are allowed to view different images.

[Patent Document 1] Japanese Laid-Open Patent Publication No. 10-268230

DISCLOSURE OF INVENTION

Problems to be Solved by the Invention

However, an image display device having a parallax barrier element has a problem in that it is difficult to perform a bright display with a broad viewing range.

As shown in FIGS. 37(a) and (b), an image display device having the parallax barrier element 510 includes a region A reachable only by the display light from a pixel P1 belonging to the first group of pixels, a region B reachable only by the display light from a pixel P2 belonging to the second group of pixels, and a region C reachable by both the display light from the pixel P1 and the display light from the pixel P2. In the region C, the display light from the pixel P1 belonging to the first group of pixels and the display light from the pixel P2 belonging to the second group of pixels are mixed, thus hindering normal viewing. This region C is also called a crosstalk region.

In order to narrow the crosstalk region C, as can also be seen from a comparison between FIG. 37(a) and FIG. 37(b), the width of each light-transmitting portion 502 of the parallax barrier element 510 may be narrowed. As shown in FIG. 37(a), by narrowing the width of each light-transmitting portion 502, the crosstalk region C is narrowed, whereby regions where normal viewing is possible (hereinafter simply referred to as "normal-viewing regions") A, B can be broadened.

However, narrowing the width of the light-transmitting portions 502 means broadening the width of the light-shielding portions 501. Therefore, if the width of the light-transmitting portions 502 is narrowed and thus the normal-viewing regions A and B are broadened, the display luminance will be lowered and a dark display will be obtained. On the other hand, if the width of each light-transmitting portion 502 is broadened as shown in FIG. 37(b), the crosstalk region C will become broader and the normal-viewing regions A and B will become narrower, although the display luminance will be high. Thus, a trade off exists between the viewing range and the luminance, and it has been difficult to enhance both.

The present invention has been made in view of the aforementioned problems, and an objective thereof is to, in an image display device having a parallax barrier element, realize a bright display with a broad viewing range.

Means for Solving the Problems

An image display device according to the present invention comprises: a display panel having a first group of pixels for displaying a first image and a second group of pixels for displaying a second image; and a parallax barrier element for separating display light emitted from the first group of pixels and display light emitted from the second group of pixels, the parallax barrier element including a plurality of light-shielding portions and a plurality of light-transmitting portions which are alternately positioned within a same plane, wherein, the parallax barrier element includes converging elements respectively provided for the plurality of light-transmitting portions.

In a preferred embodiment, the converging elements are lenses.

In a preferred embodiment, the image display device according to the present invention comprises a resin layer which is in contact with a surface of each lens that is closer to the display panel, wherein, a refractive index of the lenses and a refractive index of the resin layer are different.

In a preferred embodiment, the refractive index of the lenses is higher than the refractive index of the resin layer.

In a preferred embodiment, a thickness of the resin layer is greater than a thickness of the lenses.

In a preferred embodiment, the resin layer is made of an ultraviolet-curing type adhesive, a visible-light-curing type adhesive, or a thermosetting type adhesive.

In a preferred embodiment, the image display device according to the present invention comprises an air layer which is in contact with a surface of each lens that is closer to the display panel.

In a preferred embodiment, the lenses are lenses in the shape of curved surfaces or prisms.

In a preferred embodiment, the lenses are convex lenses having a predetermined radius of curvature.

In a preferred embodiment, the convex lenses are lenticular lenses.

In a preferred embodiment, the plurality of light-shielding portions and the plurality of light-transmitting portions are arranged in stripes.

In a preferred embodiment, the plurality of light-shielding portions and the plurality of light-transmitting portions are arranged in a staggered manner.

In a preferred embodiment, the display panel is a liquid crystal display panel including a liquid crystal layer.

An electronic apparatus according to the present invention comprises an image display device of the above construction.

The electronic apparatus according to the present invention may be a car navigation system.

A parallax barrier element according to the present invention is a parallax barrier element having a plurality of light-shielding portions and a plurality of light-transmitting portions which are alternately positioned within a same plane, comprising converging elements respectively provided for the plurality of light-transmitting portions.

In a preferred embodiment, the converging elements are lenses.

Effects of the Invention

A parallax barrier element of an image display device according to the present invention includes converging elements respectively provided for a plurality of light-transmitting portions, and therefore is able to narrow the respective luminance distribution of display light emitted from a first group of pixels and display light emitted from a second group of pixels of a display panel. Thus, the crosstalk regions in which mixing of display light occurs are narrowed and the normal-viewing regions are broadened, and therefore a sufficient viewing range can be obtained even if the width of a light-transmitting portion is broadened for an improved luminance. As a result, a bright display with a broad viewing range can be realized.

BRIEF DESCRIPTION OF DRAWINGS

FIG. 31 (a) is a diagram showing an exemplary arrangement of pixels (color filter arrangement) of a liquid crystal display panel; (b) is a diagram showing an exemplary arrangement of light-shielding portions, light-transmitting portions, and lenses of a parallax barrier element; and (c) is a diagram showing the arrangement shown in (a) and the arrangement shown in (b) overlaid on each other.

FIG. 32 (a) is a diagram showing an exemplary arrangement of pixels (color filter arrangement) of a liquid crystal display panel; (b) is a diagram showing an exemplary arrangement of light-shielding portions, light-transmitting portions, and lenses of a parallax barrier element; and (c) is a diagram showing the arrangement shown in (a) and the arrangement shown in (b) overlaid on each other.

FIGS. 37 (a) and (b) are diagrams schematically showing how images (display light) are separated by a parallax barrier element.

Figure 1:
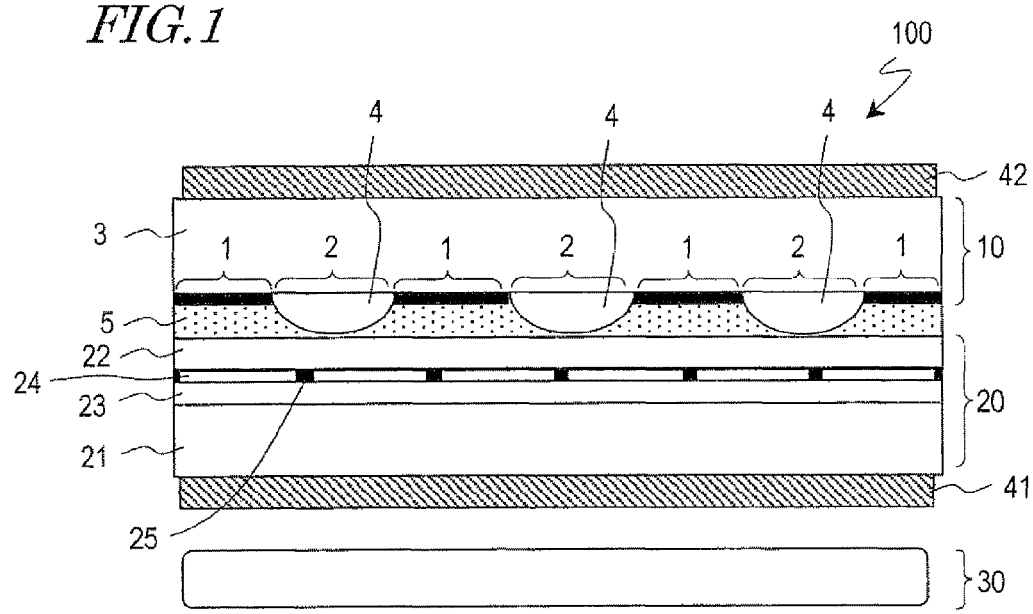
FIG. 1 A cross-sectional view schematically showing an image display device 100 according to a preferred embodiment of the present invention.

| DESCRIPTION OF REFERENCE NUMERALS | |
|---|---|
| 1 | light-shielding portion |
| 2 | light-transmitting portion |
| 3 | transparent substrate |
| 4 | lens (converging element) |
| 4A | prism (converging element) |
| 5 | resin layer |
| 6 | air layer |
| 7 | sealing member |
| 8 | double-faced tape |
| 10 | parallax barrier element |
| 20 | liquid crystal display panel |
| 21 | active matrix substrate |
| 22 | color filter substrate |
| 23 | liquid crystal layer |
| 24 | color filters |
| 25 | black matrix |
| 30 | backlight (illuminator) |
| 41, 42 | polarizer |

BEST MODE FOR CARRYING OUT THE INVENTION

Hereinafter, embodiments of the present invention will be described with reference to the drawings. Note that the present invention is not to be limited to the following embodiments.

FIG. 1 shows an image display device 100 according to the present embodiment. The image display device 100 is a dual-view display device which allows a plurality of viewers to view respectively different images.

A shown in FIG. 1, the image display device 100 includes, from the viewer's side, a parallax barrier element 10, a liquid crystal display panel 20, and a backlight (illuminator) 30.

The backlight 30 includes a light source, and emits light toward the liquid crystal display panel 20. The backlight 30 may be a direct type backlight, or an edge-light type backlight having a light guide plate. As a light source of the backlight 30, various light sources can be used, such as a cold-cathode tube (CCFL) or a light-emitting diode (LED).

The liquid crystal display panel 20 includes an active matrix substrate 21 and a color filter substrate 22, and a liquid crystal layer 23 interposed therebetween. On the active matrix substrate 21, pixel electrodes, thin film transistors (TFTs), and the like are formed (not shown). On the color filter substrate 22, color filters 24, a black matrix 25, and a counter electrode (not shown) are formed. As a display mode of the liquid crystal display panel 20, various display modes can be used, such as the TN (Twisted Nematic) mode, the STN (Super Twisted Nematic) mode, the IPS (In-Plane Switching) mode, or the VA (Vertical Alignment) mode.

The liquid crystal display panel 20 includes a first group of pixels for displaying a first image and a second group of pixels for displaying a second image. The first image and the second image are different images to be viewed by different viewers. For example, in the case where the image display device 100 is used for a car navigation system, the first image is an image for a driver, whereas a second image is an image for a person sitting in the passenger seat.

The parallax barrier element 10 includes plurality of light-shielding portions 1 and a plurality of light-transmitting portions 2 which are alternately positioned within the same plane, and separates display light emitted from the first group of pixels and the display light emitted from the second group of pixels. The light-shielding portions 1 and the light-transmitting portions 2 are formed by providing a patterned light shielding layer on the surface of a transparent substrate (e.g., a glass substrate or a plastic substrate) 3 that is closer to the liquid crystal display panel 20.

On the backlight 30 side of the active matrix substrate 21 and the viewer's side of the transparent substrate 3 of the parallax barrier element 10, a pair of polarizers 41 and 42 are provided. As for the polarizers 41 and 42, it suffices if one is provided on the backlight 30 side of the liquid crystal layer 23 and one is provided the viewer's side of the liquid crystal layer 23, and the positioning of the polarizers 41 and 42 is not limited to the example herein.

As shown in FIG. 1, the parallax barrier element 10 in the present embodiment includes a lens 4 for each of the plurality of light-transmitting portions 2, the lens 4 being provided as a converging element. Specifically, the lenses 4 are convex lenses with a predetermined radius of curvature, e.g., lenticular lenses in semicylindrical shape.

The parallax barrier element 10 is bonded to the surface of the color filter substrate 22 that is on the viewer's side, with a resin layer 5 which is provided so as to cover the lenses 4. For example, the resin layer 5 is made of an ultraviolet-curing type adhesive, a visible-light-curing type adhesive, or a thermosetting type adhesive, and is provided so that its thickness is greater than the thickness of the lenses 4, thus allowing the parallax barrier element 10 to be bonded to the liquid crystal display panel 20.

Figure 2:
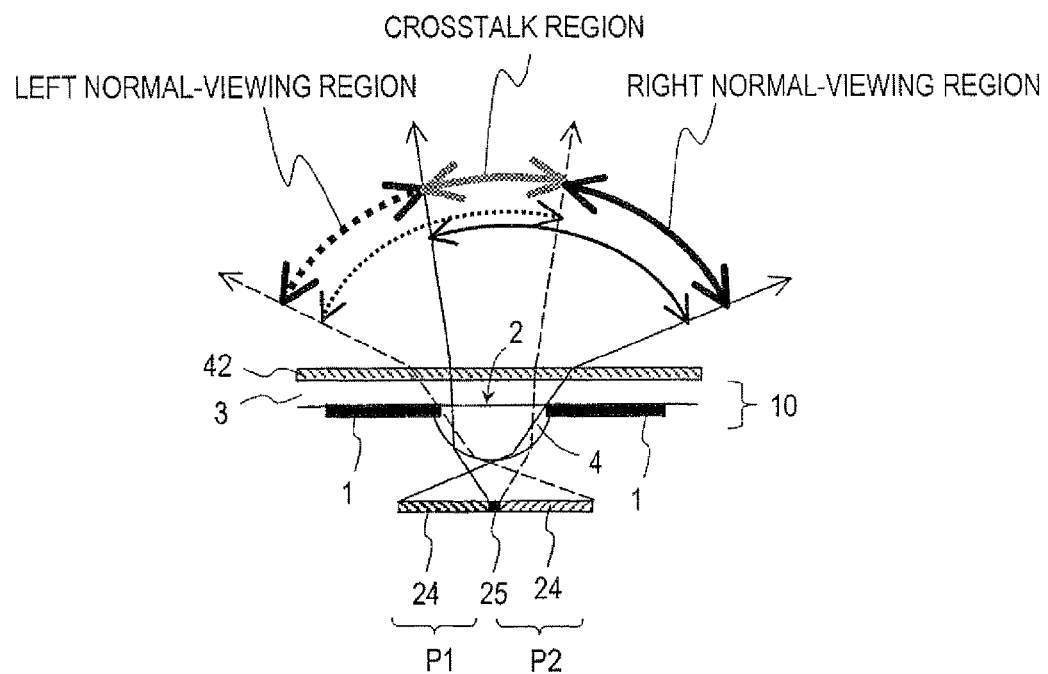
FIG. 2 A diagram schematically showing how an image (display light) is separated by a parallax barrier element.

Since the parallax barrier element 10 of the image display device 100 of the present embodiment includes lenses (converging elements) 4 which are provided in the light-transmitting portions 2, as shown in FIG. 2, the parallax barrier element 10 can converge light having passed through the color filters 24 into the frontal direction, and narrow the luminance distribution of the display light emitted from any pixel P1 belonging to the first group of pixels and that of the display light emitted from any pixel P2 belonging to the second group of pixels. Thus, the crosstalk regions in which mixing of display light occurs are narrowed and the normal-viewing regions are broadened, and therefore a sufficient viewing range can be obtained even if the width a light-transmitting portion 2 is broadened for an improved luminance. As a result, a bright display with a broad viewing range can be realized. Because of being provided in the light-transmitting portions 2, the lenses (converging elements) 4 are positioned within substantially the same plane as the barrier pattern which is composed of the light-shielding portions 1 and the light-transmitting portions 2. Therefore, converged light will not be scattered by any other member before passing through the barrier pattern, and thus the crosstalk regions can be effectively reduced.

Hereinafter, effects due to the provision of the converging elements will be described based on specific examples.

Figure 3:
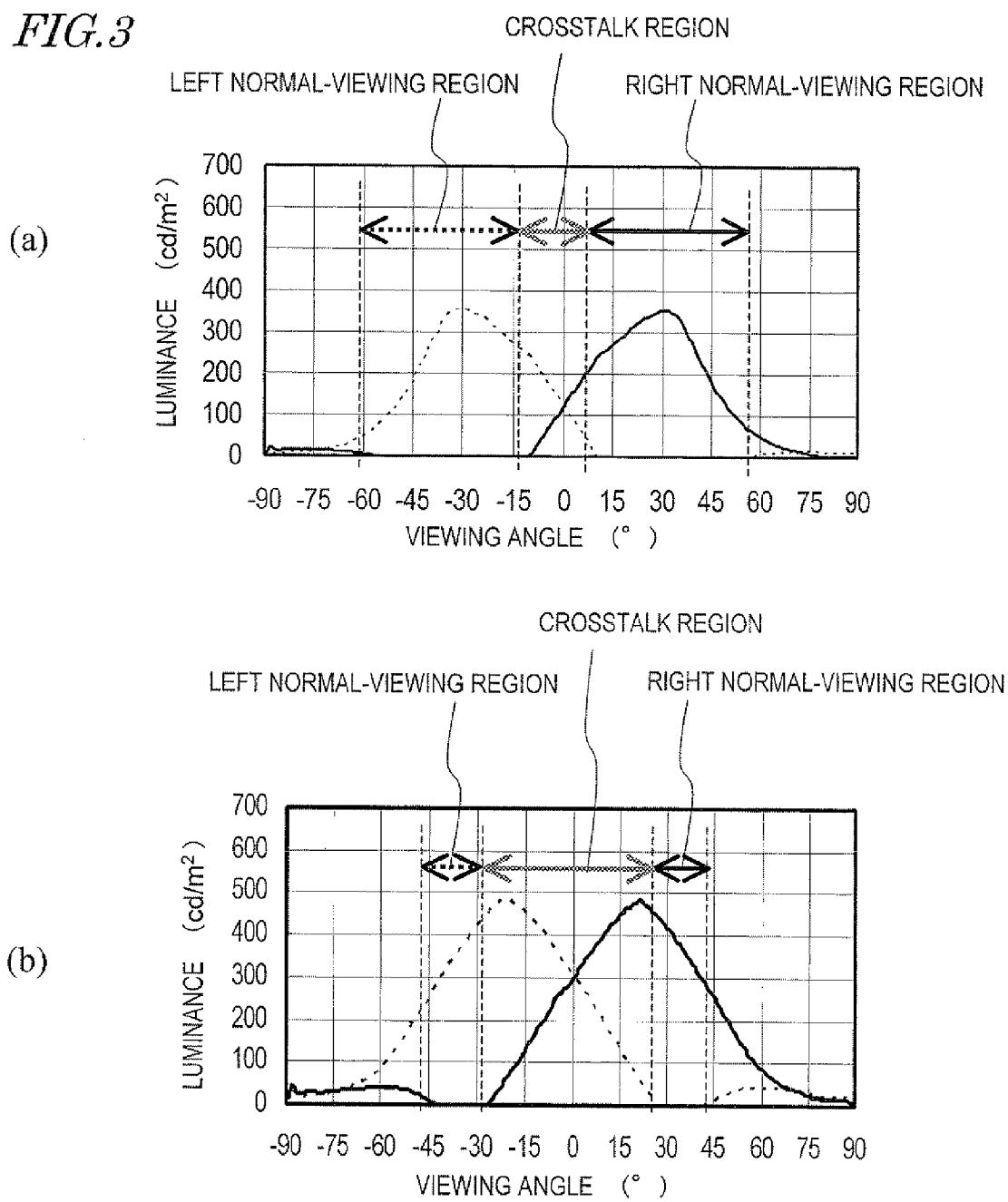
FIGS. 3 (a) and (b) are graphs showing luminance distributions of separated display light in image display devices according to Comparative Examples.

Firstly, luminance distributions of display light in image display devices of Comparative Examples, which lack converging elements, are shown in FIGS. 3(*a*) and (*b*). FIGS. 3(*a*) and (*b*) are graphs showing relationships between viewing angle (Viewing Angle) and luminance (Brightness). FIG. 3(*a*) corresponds to a construction (Comparative Example 1) where the light-transmitting portions shown in FIG. 37(*a*) nave a narrow width; and FIG. 3(*b*) corresponds to a construction (Comparative Example 2) where the light-transmitting portions shown in FIG. 37(*b*) have a broad width. Note that, in FIGS. 3(*a*) and (*b*), the luminance distribution of display light from a pixel P1 belonging to the first group of pixels is shown by a solid line, whereas the luminance distribution of display light from a pixel P2 belonging to the second group of pixels is shown by a dotted line. The specifications of the image display devices of Comparative Example 1 and Comparative Example 2 are as shown in Table 1 and Table 2, respectively.

TABLE 1

| Comparative Example 1 7" WVGA (800 × 480) | |
|---|---|
| width of light-transmitting portion | 40 μm |
| width of light-shielding portion | 90 μm |
| pitch of color filters | 65 μm |
| thickness of resin layer | 40 μm |
| thickness of glass substrate of color filter substrate | 40 μm |
| refractive index of glass substrate | about 1.51 |
| refractive index of resin layer | about 1.50 |

TABLE 2

| Comparative Example 2 7" WVGA (800 × 480) | |
|---|---|
| width of light-transmitting portion | 65 μm |
| width of light-shielding portion | 65 μm |
| pitch of color filters | 65 μm |
| thickness of resin layer | 40 μm |
| thickness of glass substrate of color filter substrate | 40 μm |
| refractive index of glass substrate | about 1.51 |
| refractive index of resin layer | about 1.50 |

As shown in Table 1 and Table 2, between Comparative Example 1 and Comparative Example 2, only the widths of the light-transmitting portions and the light-shielding portions are different. If the width of a light-transmitting portion is made as narrow as 40 μm in order to narrow the crosstalk regions and broaden the viewing range, as in Comparative Example 1, a viewing range of about 10° to 55° will be obtained but the peak luminance will be as low as about 350 cd/m$^2$, as shown in FIG. 3(*a*).

On the other hand, if the width of a light-transmitting portion is made as broad as 65 μm for an improved luminance, as in Comparative Example 2, the crosstalk regions will become broad and the viewing range will become as narrow as about 25° to 45°, as shown in FIG. 3(*b*). As for luminance, although the peak luminance is as high as 480 cd/m$^2$, the luminance peaks (near viewing angles of 20° to 25°) are located within the crosstalk regions, so that in actuality it is impossible to observe an image with such a high luminance. The luminance within the normal-viewing regions will be substantially the same as in the case where the width of a light-transmitting portion is narrow.

As described above, it is impossible to reconcile a high luminance and a broad viewing range in an image display device where converging elements are not provided in the light-transmitting portions of the parallax barrier element.

Figure 4:
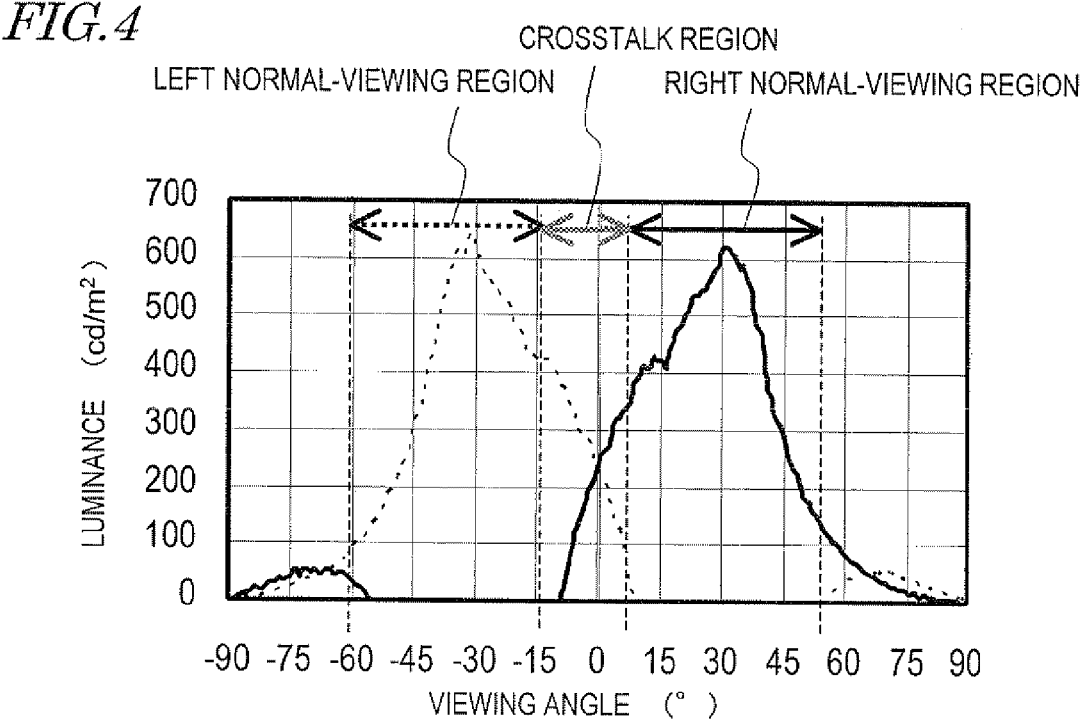
FIG. 4 A graph showing a luminance distribution of separated display light in the image display device 100.

Next, the luminance distribution of display light in the image display device 100 having the lenses 4 as converging elements is shown in FIG. 4. In FIG. 4, too, the luminance distribution of display light from a pixel P1 belonging to the first group of pixels is shown by a solid line, whereas the luminance distribution of display light from a pixel P2 belonging to the second group of pixels is shown by a dotted line. The specifications of the image display device 100 used are as shown in Table 3.

TABLE 3

| 7" WVGA (800 × 480) | |
|---|---|
| width of light-transmitting portion | 65 μm |
| width of light-shielding portion | 65 μm |
| pitch of color filters | 65 μm |
| thickness of resin layer | 40 μm |
| thickness of glass substrate of color filter substrate | 40 μm |
| thickness of lens | 30 μm |
| refractive index of glass substrate | about 1.51 |
| refractive index of resin layer | about 1.40 |
| refractive index of lens | about 1.55 |

As shown in Table 3, in the image display device 100, the widths of the light-transmitting portions and the light-shielding portions are equal to those of Comparative Example 2. Nonetheless, in the image display device 100, as shown in FIG. 4, the width of the crosstalk region is narrower than that of Comparative Example 2, and a viewing range which is as broad as about 10° to 60° is obtained. Moreover, the peak luminance is as high as 600 cd/m². Thus, by providing converging elements in the light-transmitting portions 2, it becomes possible to realize a bright display with a broad viewing range.

Note that, in order to allow light to be refracted at the interface between each lens 4 as a converging element and the resin layer 5 which is in contact with the surface of the lens 4 that is closer to the liquid crystal display panel 20, the refractive index of the lenses 4 is different from the refractive index of the resin layer 5, and the refractive index of the lenses 4 is higher than the refractive index of the resin layer 5, as is also shown in Table 3.

In order to allow light to be sufficiently refracted at the interfaces between the lenses 4 and the resin layer 5, it is preferable that the difference in refractive index between the lenses 4 and the resin layer 5 is at least 0.05 or more. Moreover, since the convergence action of the lenses 4 will become greater as the refractive index difference is larger, the difference between the refractive index of the lenses 4 and the refractive index of the resin layer 5 is preferably as large as possible.

In the case where an ultraviolet-curing acrylate type material is used as the material of the resin layer 5, for example, the refractive index is generally about 1.5. However, the refractive index can be lowered by introducing a fluorine-type substituent. By also taking into consideration the adhesion of the resin layer 5, the refractive index may be made as low as approximately 1.35.

On the other hand, in the case where the lenses 4 are formed through a photolithography process as will be described later, again it is possible to employ an ultraviolet-curing acrylate type material as the material of the lenses 4. Although the general refractive index of an acrylate type material is about 1.5 as has already been mentioned, the refractive index can be made as high as about 1.60 by introducing a component having a high refractive index (e.g., a sulfur-type substituent). Moreover, by dispersing metal nanoparticles having a high refractive index (e.g., zirconia) into the lens material, the refractive index can be further increased to about 1.80.

By employing the aforementioned low-refractive index resin layer material and high-refractive index lens material, it becomes possible to increase the refractive index difference between the lenses 4 and the resin layer 5 to about 0.45. Moreover, as in the image display devices 100A and 100B shown in FIG. 5 and FIG. 6, an air layer 6 which is in contact with the surface of each lens 4 that is closer to the liquid crystal display panel 20 may be provided, whereby an even greater refractive index difference can be realized. Since the refractive index of the air layer 6 is approximately 1.0, providing the air layer 6 makes it possible to increase the refractive index difference between the lenses 4 and the air layer 6 in contact therewith can be increased to about 0.8, whereby an even stronger convergence action can be obtained.

Figure 5:
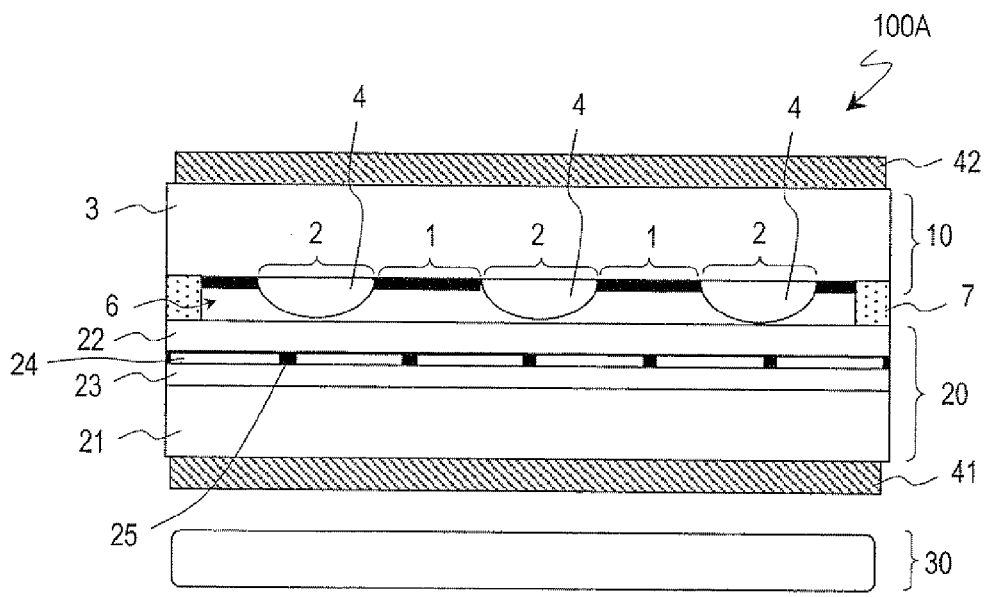
FIG. 5 A cross-sectional view schematically showing another image display device 100A according to a preferred embodiment of the present invention.
Figure 6:
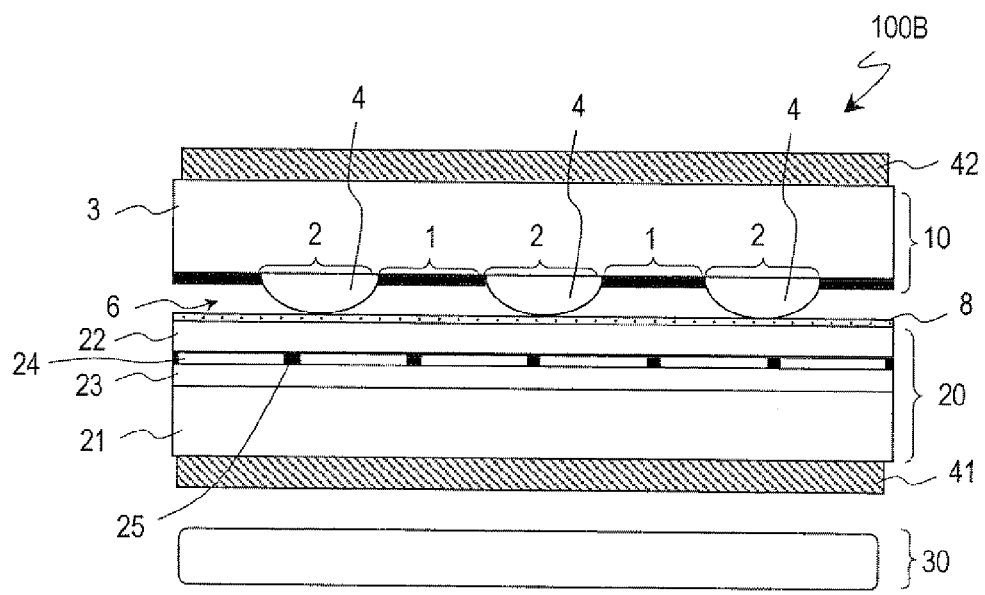
FIG. 6 A cross-sectional view schematically showing still another image display device 100B according to a preferred embodiment of the present invention.
Figure 7:
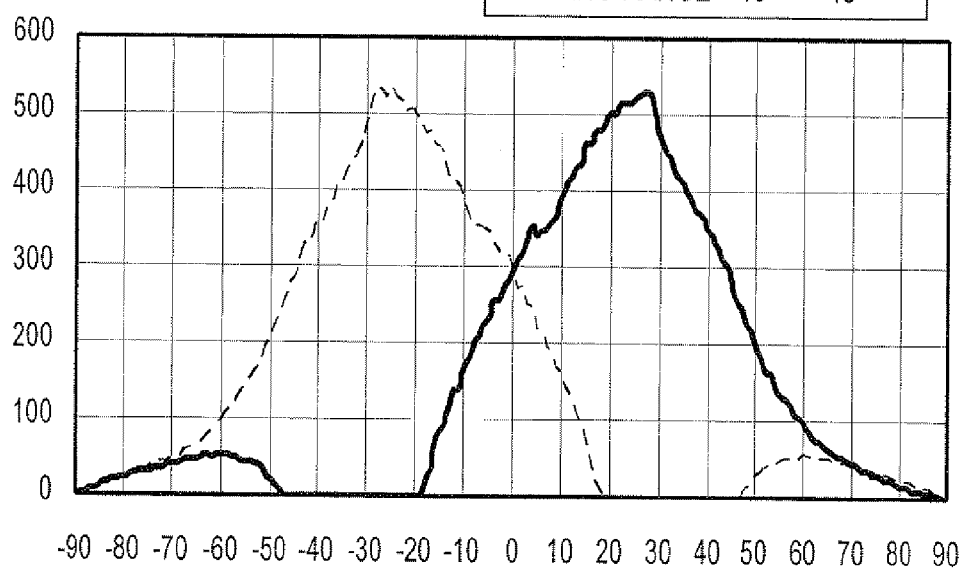
FIG. 7 A graph showing a luminance distribution of display light when a difference $\Delta n$ between a refractive index $n_L$ of lenses and a refractive index $n_R$ of a resin layer is 0.05.
Figure 8:
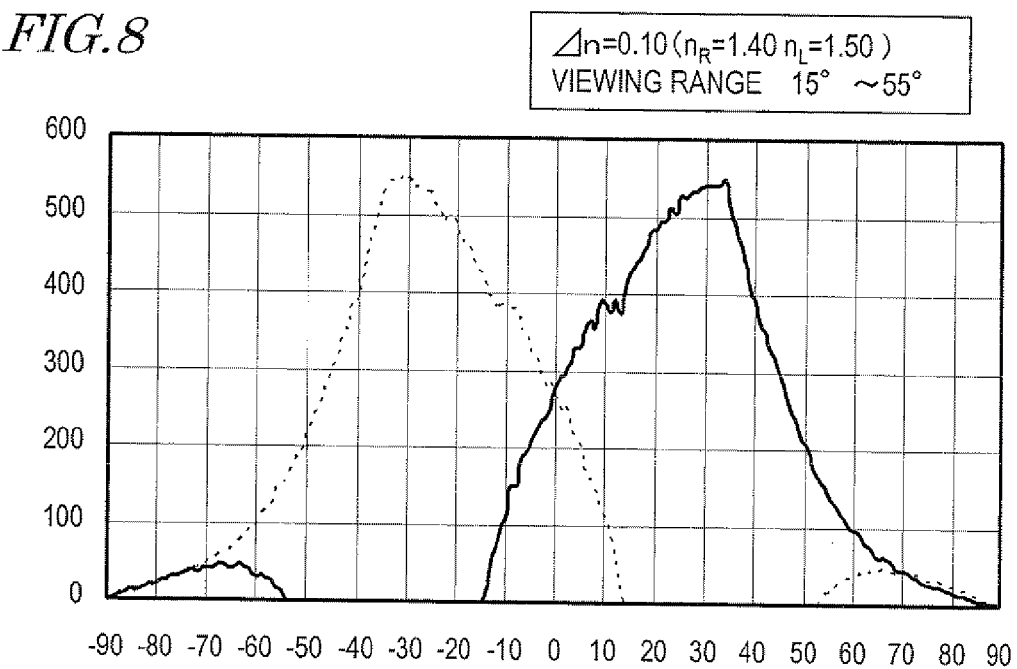
FIG. 8 A graph showing a luminance distribution of display light when a difference $\Delta n$ between a refractive index $n_L$ of lenses and a refractive index $n_R$ of a resin layer is 0.10.
Figure 9:
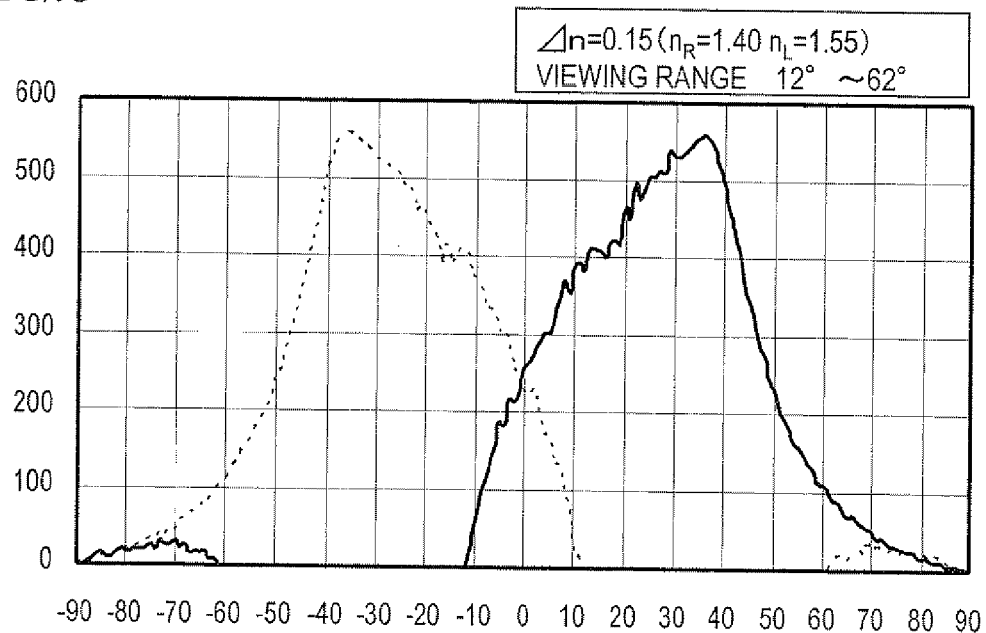
FIG. 9 A graph showing a luminance distribution of display light when a difference $\Delta n$ between a refractive index $n_L$ of lenses and a refractive index $n_R$ of a resin layer is 0.15.
Figure 10:
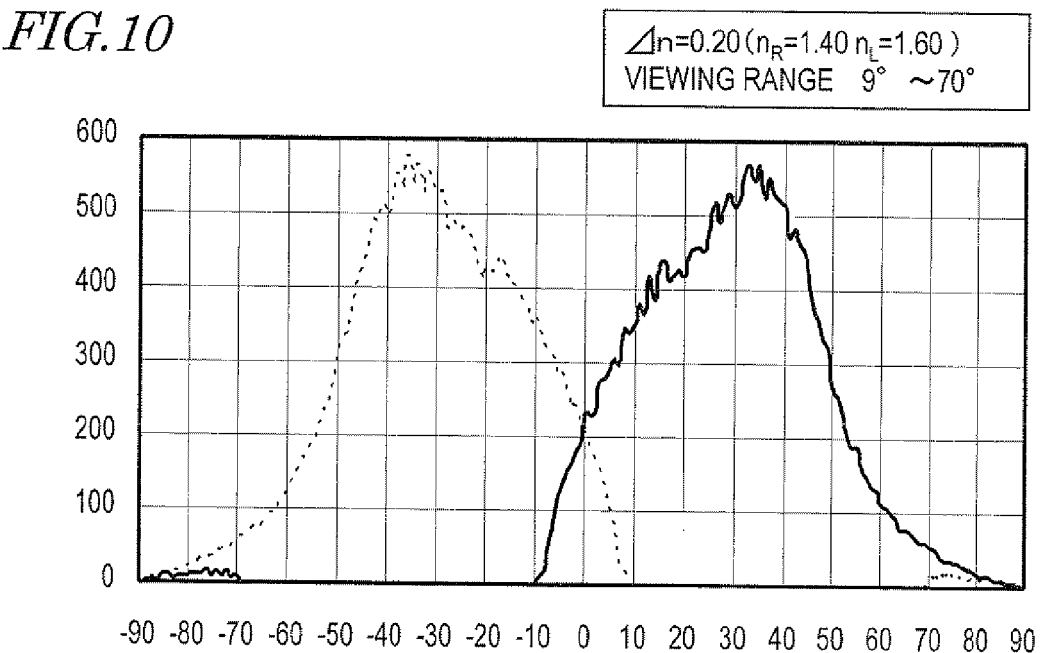
FIG. 10 A graph showing a luminance distribution of display light when a difference $\Delta n$ between a refractive index $n_L$ of lenses and a refractive index $n_R$ of a resin layer is 0.20.
Figure 11:
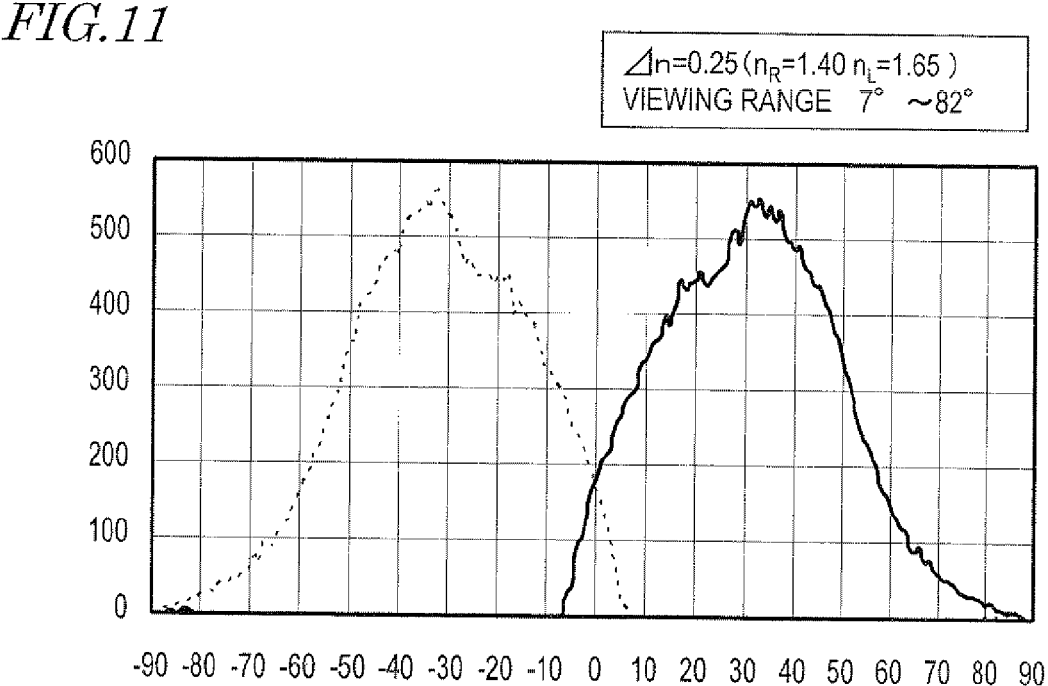
FIG. 11 A graph showing a luminance distribution of display light when a difference $\Delta n$ between a refractive index $n_L$ of lenses and a refractive index $n_R$ of a resin layer is 0.25.
Figure 12:
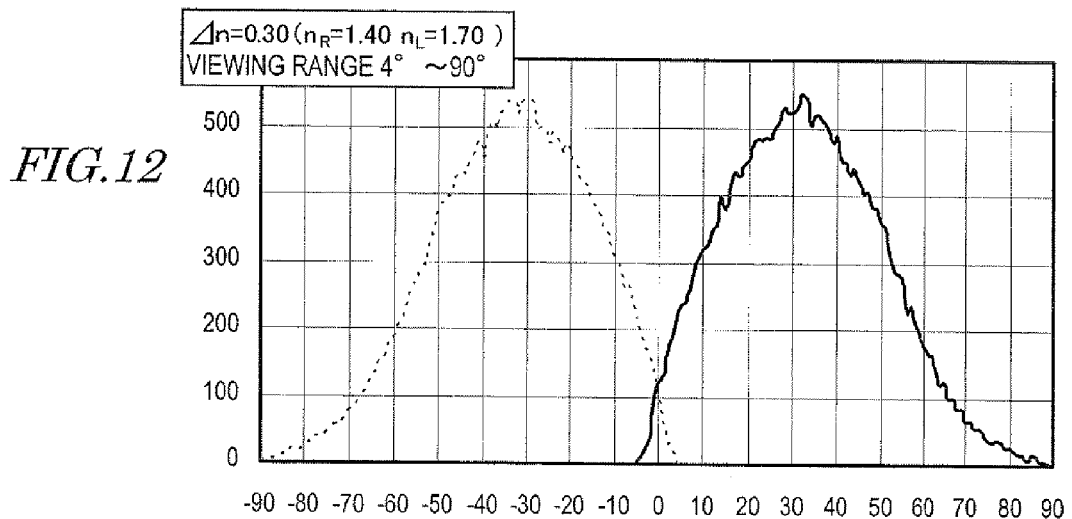
FIG. 12 A graph showing a luminance distribution of display light when a difference $\Delta n$ between a refractive index $n_L$ of lenses and a refractive index $n_R$ of a resin layer is 0.30.
Figure 13:
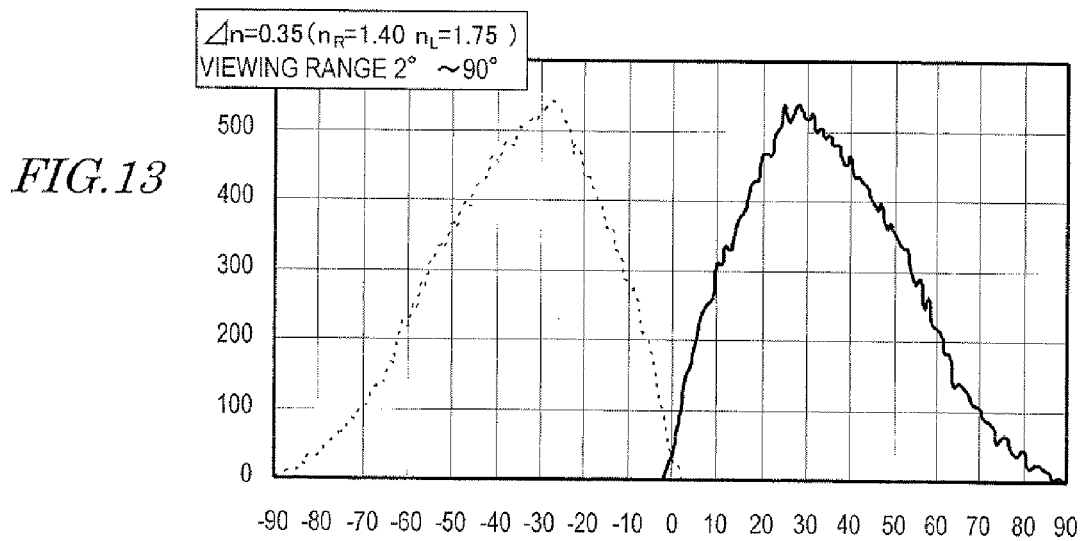
FIG. 13 A graph showing a luminance distribution of display light when a difference $\Delta n$ between a refractive index $n_L$ of lenses and a refractive index $n_R$ of a resin layer is 0.35.
Figure 14:
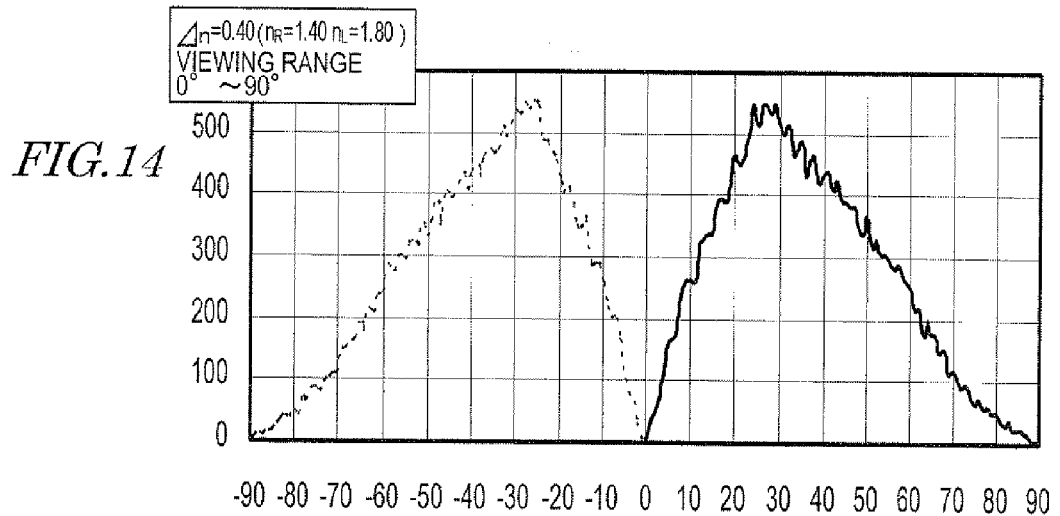
FIG. 14 A graph showing a luminance distribution of display when a difference $\Delta n$ between a refractive index $n_L$ of lenses and a refractive index $n_R$ of a resin layer is 0.40.
Figure 15:
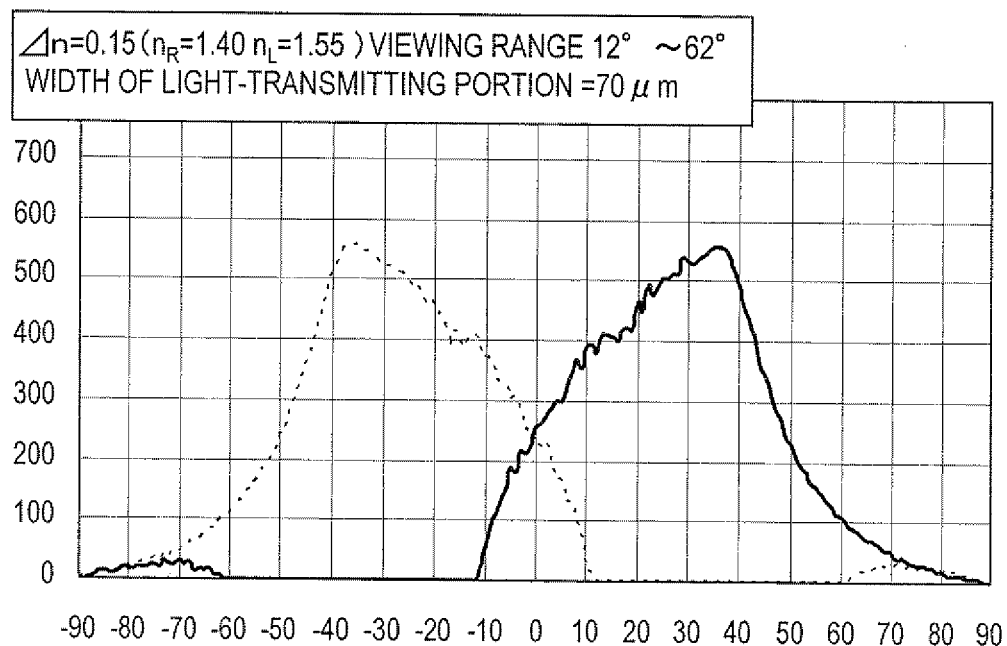
FIG. 15 A graph showing a luminance distribution of display light when a difference Δn between a refractive index $n_L$ of lenses and a refractive index $n_R$ of a resin layer is 0.15 and the width of a light-transmitting portion is 70 μm.
Figure 16:
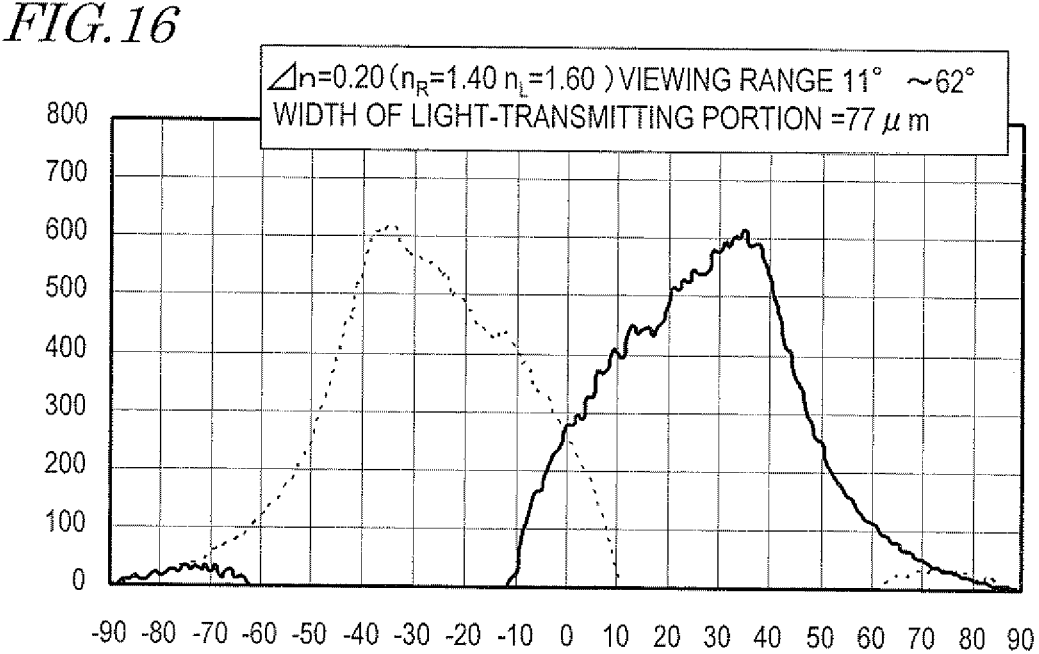
FIG. 16 A graph showing a luminance distribution of display light when a difference Δn between a refractive index $n_L$ of lenses and a refractive index $n_R$ of a resin layer is 0.20 and the width of a light-transmitting portion is 77 μm.
Figure 17:
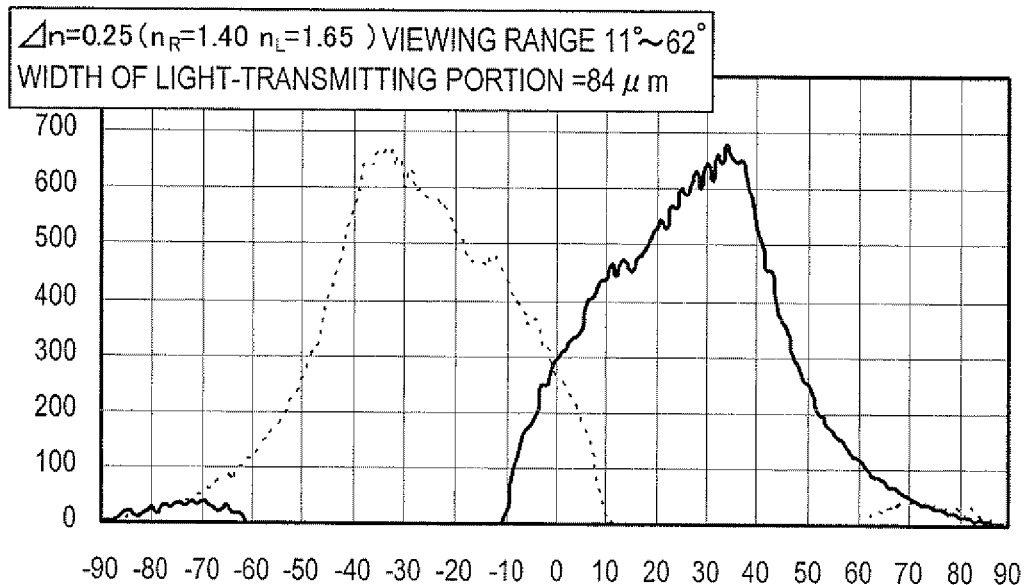
FIG. 17 A graph showing a luminance distribution of display light when a difference Δn between a refractive index $n_L$ of lenses and a refractive index $n_R$ of a resin layer is 0.25 and the width of a light-transmitting portion is 84 μm.
Figure 18:
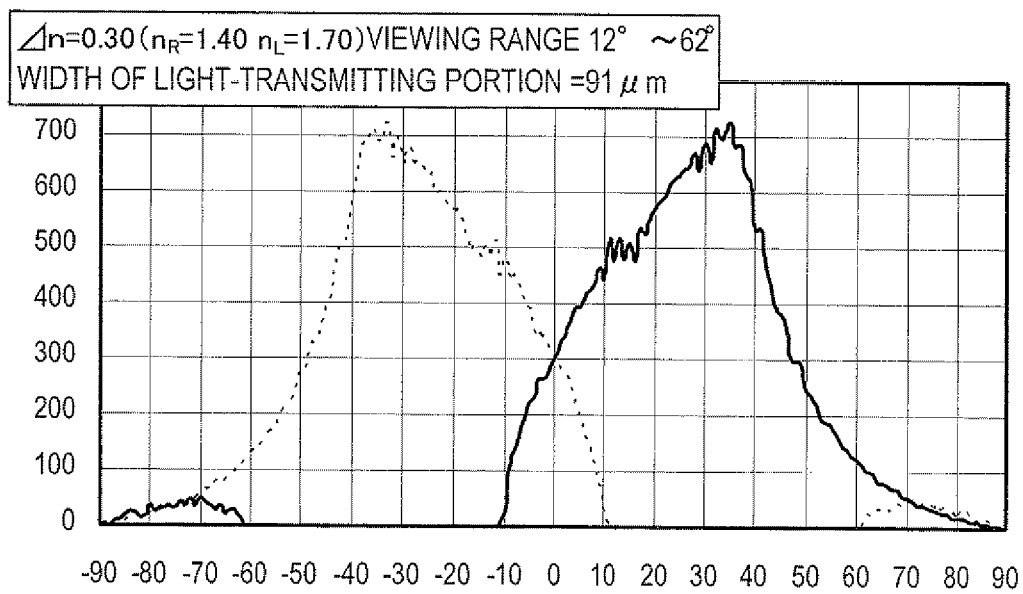
FIG. 18 A graph showing a luminance distribution of display light when a difference Δn between a refractive index $n_L$ of lenses and a refractive index $n_R$ of a resin layer is 0.30 and the width of a light-transmitting portion is 91 μm.
Figure 19:
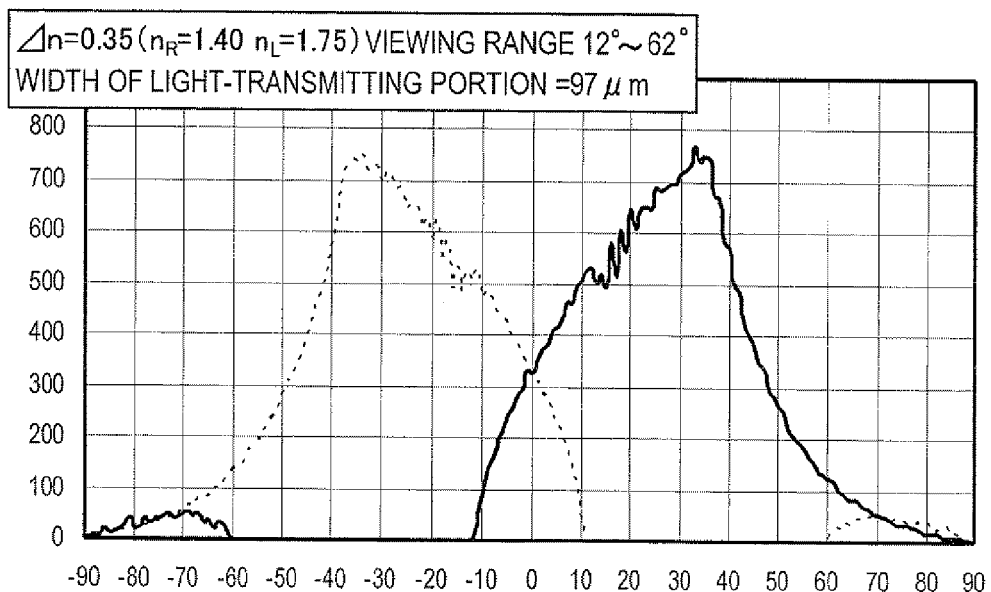
FIG. 19 A graph showing a luminance distribution of display light when a difference Δn between a refractive index $n_L$ of lenses and a refractive index $n_R$ of a resin layer is 0.35 and the width of a light-transmitting portion is 97 μm.
Figure 20:
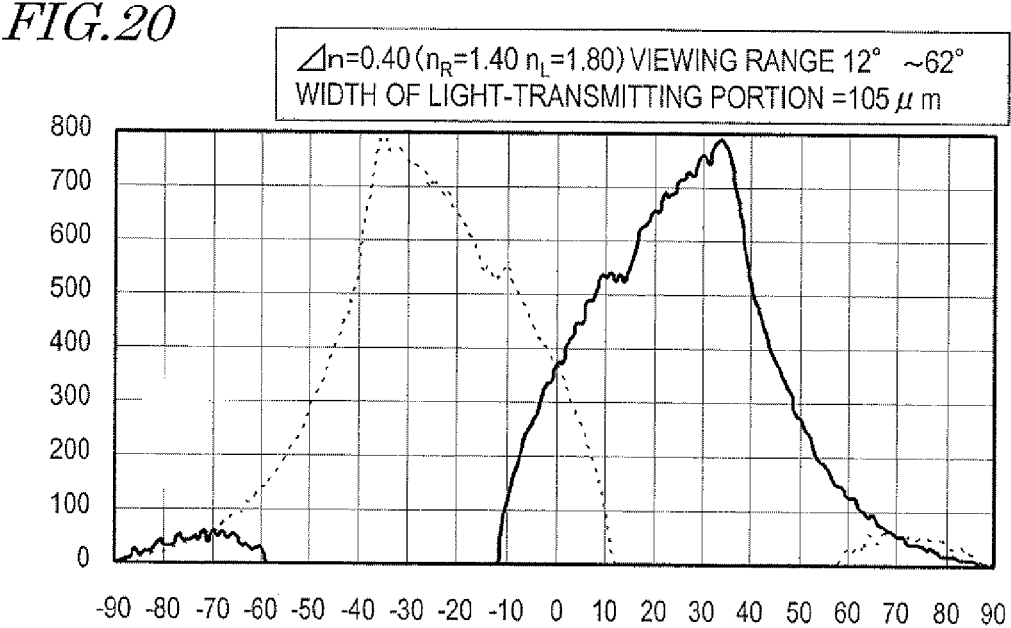
FIG. 20 A graph showing a luminance distribution of display light when a difference Δn between a refractive index $n_L$ of lenses and a refractive index $n_R$ of a resin layer is 0.40 and the width of a light-transmitting portion is 105 μm.
Figure 21:
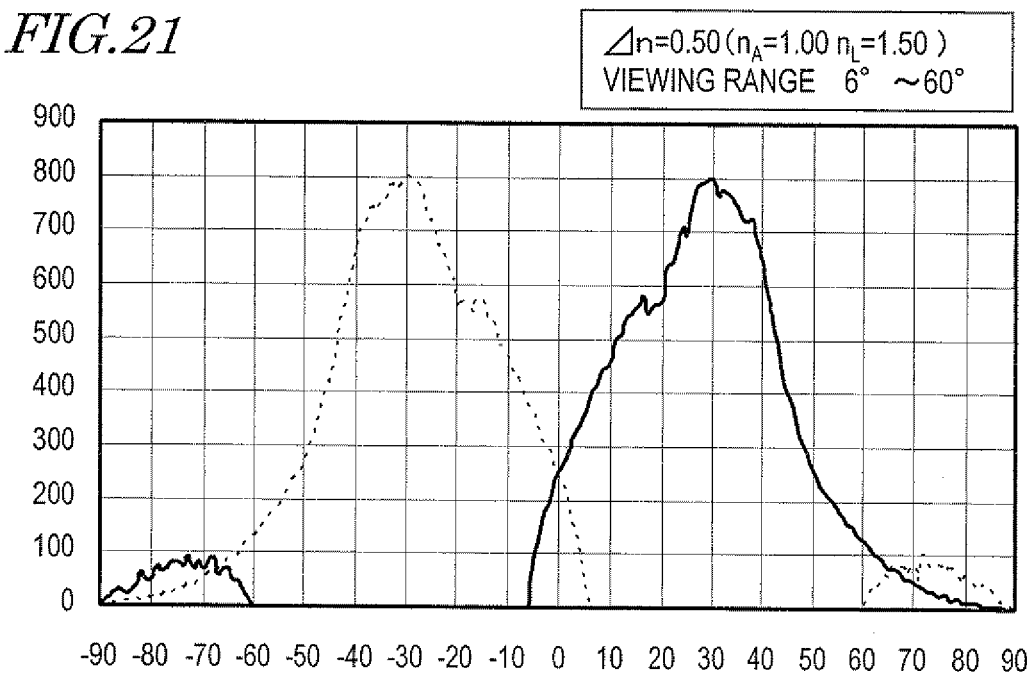
FIG. 21 A graph showing a luminance distribution of display light when a difference Δn between a refractive index $n_L$ of lenses and a refractive index $n_A$ of an air layer is 0.50.
Figure 22:
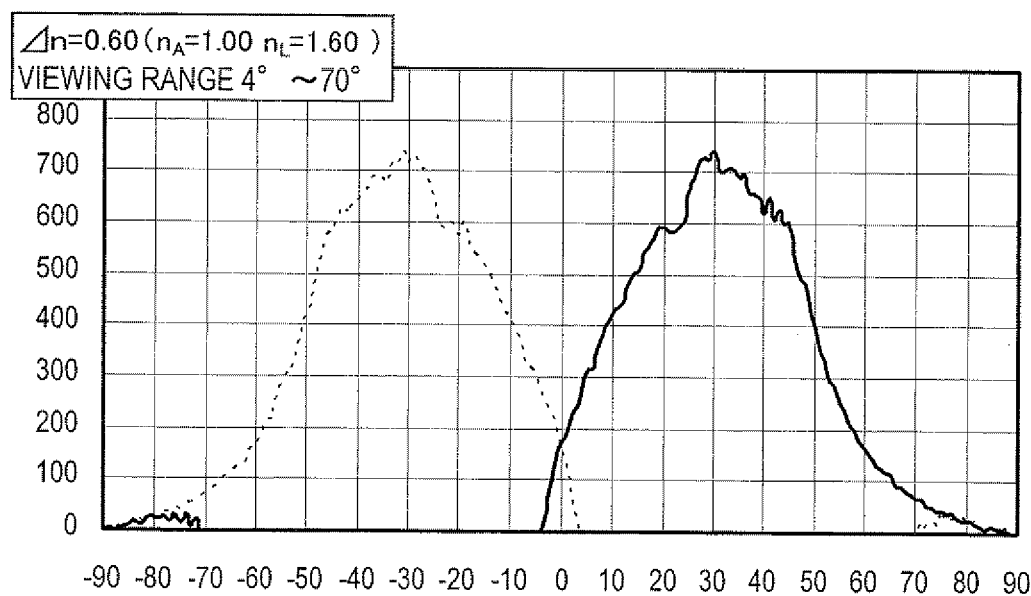
FIG. 22 A graph showing a luminance distribution of display light when a difference Δn between a refractive index $n_L$ of lenses and a refractive index $n_A$ of an air layer is 0.60.
Figure 23:
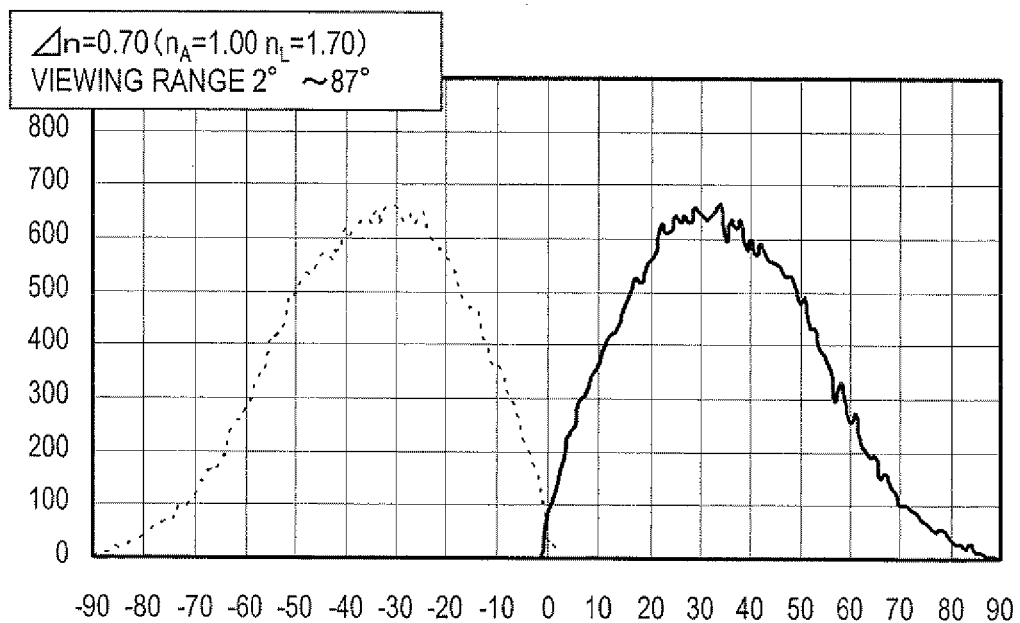
FIG. 23 A graph showing a luminance distribution of display light when a difference Δn between a refractive index $n_L$ of lenses and a refractive index $n_A$ of an air layer is 0.70.
Figure 24:
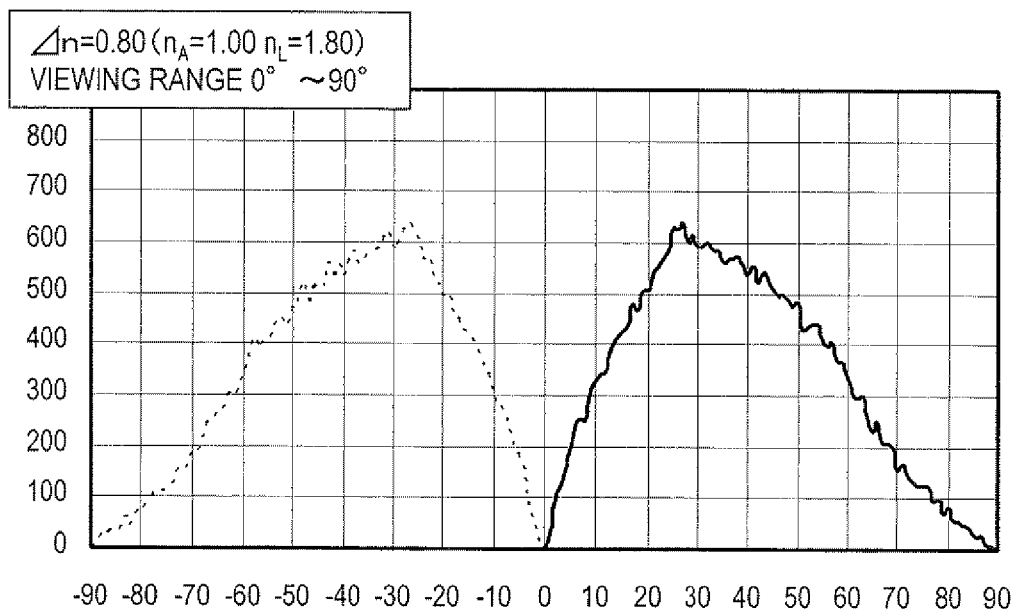
FIG. 24 A graph showing a luminance distribution of display light when a difference Δn between a refractive index $n_L$ of lenses and a refractive index $n_A$ of an air layer is 0.80.

Note that, in the case where the air layer 6 is provided, as shown in FIG. 5, the parallax barrier element 10 may be bonded to the liquid crystal display panel 20 with a frame-like sealing member 7 which is provided near the outer periphery of the color filter substrate 22, or alternatively, as shown in FIG. 6, the parallax barrier element 10 may be bonded to the liquid crystal display panel 20 with a double-faced tape 8 which is provided on the color filter substrate 22.

Next, the effect due to increasing the refractive index difference between the lenses 4 and the resin layer 5 or the refractive index difference between the lenses 4 and the air layer 6 will be described based on specific examples.

FIG. 7 to FIG. 14 show luminance distributions of display light where the refractive index difference between the lenses 4 and the resin layer 5 is varied. Herein, the refractive index of the resin layer 5 is fixed to about 1.40, while the refractive index of the lenses 4 is varied from about 1.45 to about 1.80. The specifications of the image display device used are as shown in Table 4. FIG. 7 to FIG. 14 also show values of the refractive index $n_L$ of the lenses 4, the refractive index $n_R$ of the resin layer 5, and the difference Δn therebetween.

TABLE 4

| 7" WVGA (800 × 480) | |
|---|---|
| width of light-transmitting portion | 70 μm |
| width of light-shielding portion | 60 μm |
| pitch of color filters | 65 μm |
| thickness of resin layer | 40 μm |
| thickness of glass substrate of color filter substrate | 40 μm |
| thickness of lens | 35 μm |
| refractive index of glass substrate | about 1.51 |
| refractive index of resin layer | about 1.40 |
| refractive index of lens | about 1.45 to about 1.80 |

As shown in FIG. 7 to FIG. 14, as the refractive index difference between the lenses 4 and the resin layer 5 increases, the viewing range becomes broader (i.e., the crosstalk regions become narrower), while the peak luminance (luminance near 30°) hardly changes. This is because the convergence action of the lenses 4 becomes stronger as the refractive index difference between the lenses 4 and the resin layer 5 increases.

Note that FIG. 7 to FIG. 14 show an example where the viewing range is broadened while the brightness hardly changes. Conversely, it is also possible to improve brightness while hardly changing the viewing range.

FIG. 15 to FIG. 20 show such an example. FIG. 15 to FIG. 20 show luminance distributions of display light where the refractive index difference between the lenses 4 and the resin layer 5 is varied similarly to FIG. 7 to FIG. 14, but are different from FIG. 7 to FIG. 14 in that the width of the light-transmitting portions 2 is varied while keeping the viewing range unchanged, as shown in Table 5.

TABLE 5

| 7" WVGA (800 × 480) | |
| --- | --- |
| width of light-transmitting portion | 70 to 105 µm |
| width of light-shielding portion | 65 µm |
| pitch of color filters | 65 µm |
| thickness of resin layer | 40 µm |
| thickness of glass substrate of color filter substrate | 40 µm |
| thickness of lens | 35 µm |
| refractive index of glass substrate | about 1.51 |
| refractive index of resin layer | about 1.40 |
| refractive index of lens | about 1.55 to about 1.80 |

As shown in FIG. 15 to FIG. 20, as the refractive index difference between the lenses 4 and the resin layer 5 increases, the peak luminance (luminance near 30°) is increased and the brightness is improved, while the viewing range hardly changes. This is because the convergence action of the lenses 4 becomes stronger as the refractive index difference between the lenses 4 and the resin layer 5 increases.

FIG. 21 to FIG. 24 show luminance distributions of display light where the refractive index difference between the lenses 4 and the air layer 6 is varied. Herein, the refractive index of the air layer 6 is fixed to about 1.00, while the refractive index of the lenses 4 is varied from about 1.45 to about 1.80. The specifications of the image display device used are as shown in Table 6. FIG. 21 to FIG. 24 also show the refractive index $n_L$ of the lenses 4, the refractive index $n_A$ of the air layer 6, and the difference $\Delta$ n therebetween.

TABLE 6

| 7" WVGA (800 × 480) | |
| --- | --- |
| width of light-transmitting portion | 105 µm |
| width of light-shielding portion | 25 µm |
| pitch of color filters | 65 µm |
| thickness of air layer | 40 µm |
| thickness of glass substrate of color filter substrate | 40 µm |
| thickness of lens | 35 µm |
| refractive index of glass substrate | about 1.51 |
| refractive index of air layer | about 1.00 |
| refractive index of lens | about 1.50 to about 1.80 |

As shown in FIG. 21 to FIG. 24, as the refractive index difference between the lenses 4 and the air layer 6 increases, the viewing range becomes broader (i.e., the crosstalk regions become narrower). This is because the convergence action of the lenses 4 becomes stronger as the refractive index difference between the lenses 4 and the air layer 6 increases. The reason why the peak luminance (luminance near 30°) is slightly decreased as the refractive index difference between the lenses 4 and the air layer 6 increases is that, the light reflectance at the interface between the lenses 4 and the air layer 6 is increased as the refractive index difference between the lenses 4 and the air layer 6 increases.

As described above, it is possible to increase the brightness and/or broaden the viewing range by enhancing the convergence action of the lenses 4 through increasing the refractive index difference between the lenses 4 and the resin layer 5 or the refractive index difference between the lenses 4 and the air layer 6.

Next, a method for producing the parallax barrier element 10 having the lenses (converging elements) 4 will be described with reference to FIGS. 25(a) to (g). FIGS. 25(a) to (g) are step-by-step cross-sectional views schematically showing production steps for the parallax barrier element 10.

First, as shown in FIG. 25(a), by using a roller, a photosensitive black film 1' is thermally transferred onto a transparent substrate (e.g. glass substrate) 3. As the black film 1', that which has a thickness of about 4 µm and an OD (optical density) value of about 4 can be used, for example. Although a method of thermally transferring the black film 1' onto the transparent substrate 3 is illustrated herein, this is not a limitation; a black varnish may be applied by spin coating, slit coating, ink-jet, or the like.

Next, as shown in FIG. 25(b), the black film 1' is irradiated with ultraviolet through a photomask 50, thus performing an exposure. The black film 1' may be made of a negative type material or a positive type material.

Then, a development is performed in order to pattern the black film 1', whereby a barrier pattern in which the light-shielding portions 1 and the light-transmitting portions 2 are alternately positioned is formed as shown in FIG. 25(c). Preferably, at the same time as forming the barrier pattern, an alignment pattern for lenses formation, an alignment pattern for attachment (attachment of the parallax barrier element 10 and the liquid crystal display panel 20), and the like are also formed.

Thereafter, as shown in FIG. 25(d), a photosensitive transparent film 4' for forming the lenses is thermally transferred onto the transparent substrate 3 having the barrier pattern formed thereon. As the transparent film 4', that which has a thickness of about 30 µm can be used, for example. Note that, as has been described with respect to the material layer (black film 1') for forming a barrier pattern, the material layer for forming the lenses can be formed by using various methods, without being limited to the method illustrated herein.

Next, as shown in FIG. 25(e), a gray-scale exposure is performed by irradiating the transparent film 4' with ultraviolet through a gray mask 51, and by subsequently performing a development, the transparent film 4' is shaped into rough lens shapes, as shown in FIG. 25(f).

Finally, by heating the transparent film 4' after the development at a high temperature to cause a reflow, the lenses 4 are formed in the light-transmitting portions 2. In this manner, the parallax barrier element 10 having the lenses 4 as converging elements is obtained.

Figure 25:
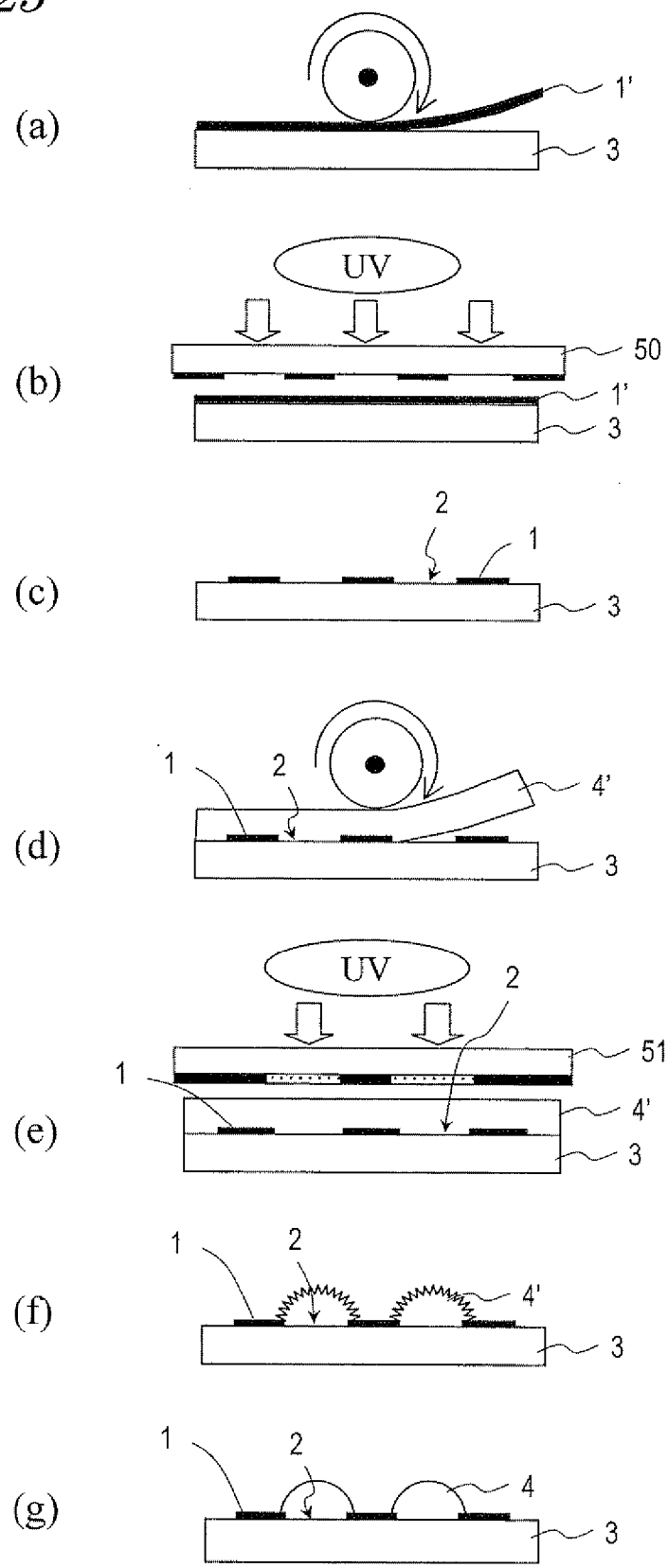
FIG. 25 (a) to (g) are step-by-step cross-sectional views schematically showing production steps for a parallax barrier element having lenses.
Figure 26:
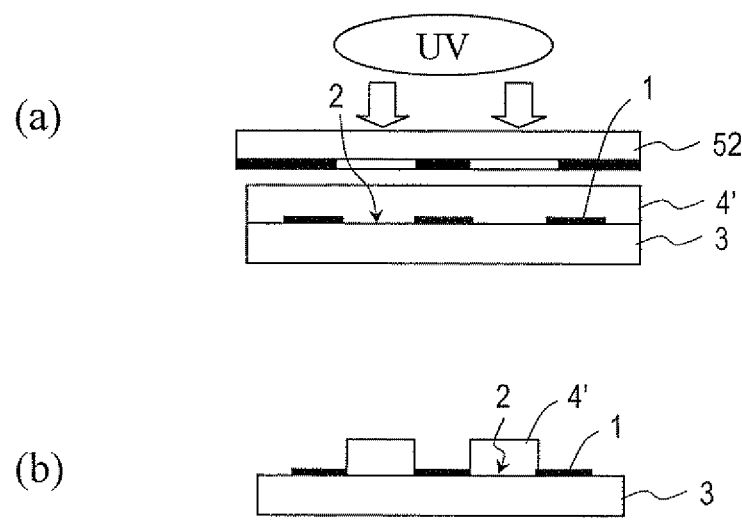
FIGS. 26 (a) and (b) are step-by-step cross-sectional views schematically showing part of the production steps for a parallax barrier element having lenses.

Note that, instead of the steps shown in FIGS. 25(e) and (f), steps shown in FIGS. 26(a) and (b) may be adopted. Specifically, as shown in FIG. 26(a), after performing an exposure by using a usual photomask 52, a development may be performed as shown in FIG. 26(*b*), followed by a reflow step as shown in FIG. 25(*g*). In the case where an exposure is performed by using a photomask (the gray mask 51 or the usual photomask 52) as shown in FIG. 25(*e*) or FIG. 26(*a*), patterning can be performed at a desired position by carrying out an alignment for the photomask with alignment markers which were formed in advance (specifically, at the time of forming a barrier pattern).

Figure 27:
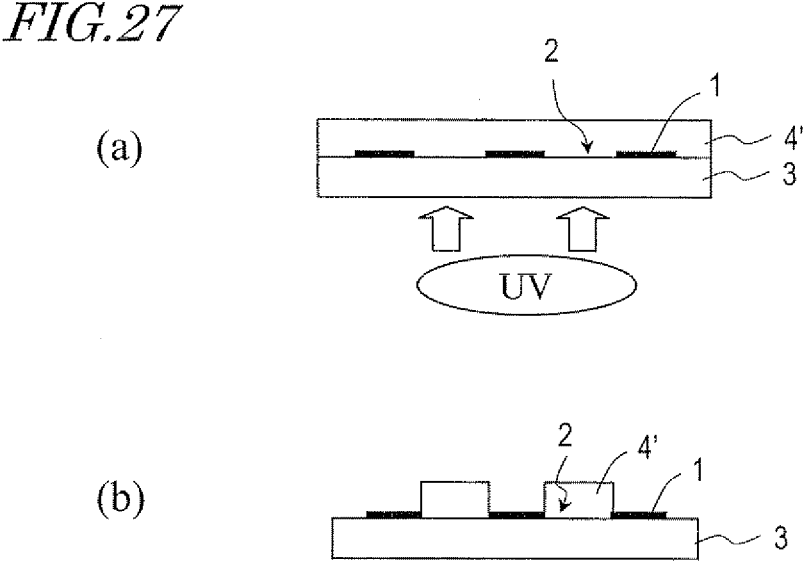
FIGS. 27 (a) and (b) are step-by-step cross-sectional views schematically showing part of the production steps for a parallax barrier element having lenses.

Alternatively, instead of the steps shown in FIGS. 25(*e*) and (*f*), the steps shown in FIGS. 27(*a*) and (*b*) may be adopted. Specifically, as shown in FIGS. 27(*a*) and (*b*), an ultraviolet irradiation may be performed through the rear face of the transparent substrate 3 (the face on which the barrier pattern is not formed) to perform an exposure and development by using the barrier pattern as a mask, and thereafter the reflow step shown in FIG. 25(*g*) may be executed, thereby allowing the lenses 4 to be formed in a self-aligning manner in the light-transmitting portions 2 between the light-shielding portions 1.

Figure 28:
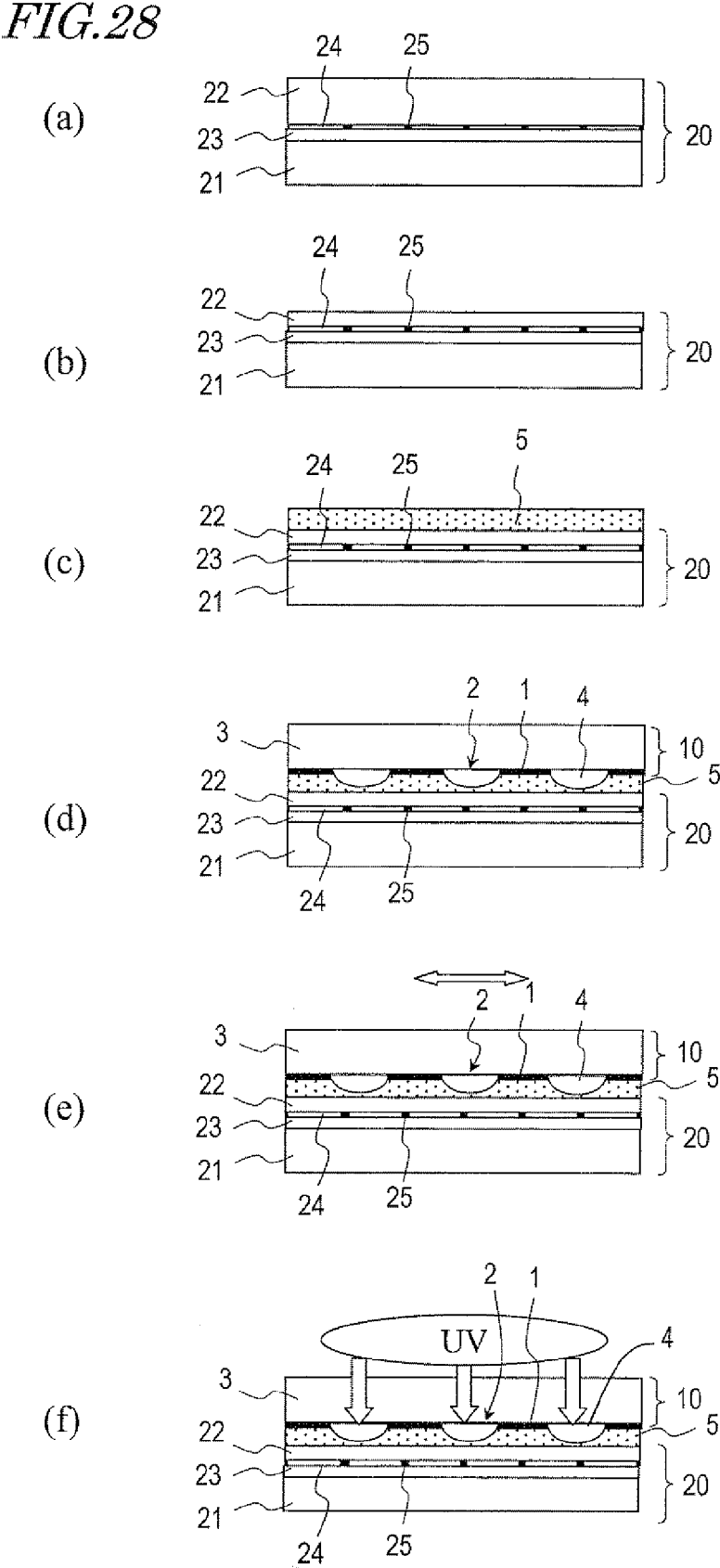
FIG. 28 (a) to (f) are step-by-step cross-sectional views schematically showing a step of attaching a parallax barrier element and a liquid crystal display panel.

Next, a method of attaching the parallax barrier element 10 and the liquid crystal display panel 20 will be described with reference to FIGS. 28(*a*) to (*f*). FIGS. 28(*a*) to (*f*) are step-by-step cross-sectional views schematically showing a step of attaching the parallax barrier element 10 and the liquid crystal display panel 20.

First, the liquid crystal display panel 20 as shown in FIG. 28(*a*) is provided, and as shown in FIG. 28(*b*), the color filter substrate 22 of the liquid crystal display panel is made thin by chemical etching or grinding. Although the process of thinning the color filter substrate 22 is performed for the completed liquid crystal display panel 20 herein, it would also be possible to perform thinning of the color filter substrate 22 at a certain phase during the production steps of the liquid crystal display panel 20.

Next, as shown in FIG. 28(*c*), the resin layer 5 is formed by applying a resin material on the color filter substrate 22. The resin material may be applied by using various methods, such as spin coating, slit coating, or ink-jet. Alternatively, the resin layer 5 may be formed by attaching a film which is made of a resin material.

Then, as shown in FIG. 28(*d*), the liquid crystal display panel 20 and the parallax barrier element 10 are attached via the resin layer 5. Herein, by carrying out the attachment under a reduced pressure (in a substantial vacuum), mixing of bubbles into the resin layer 5 is prevented. It will be appreciated that the attachment may be performed in the atmospheric air; in this case, too, it is preferable to employ a method and material which will prevent mixing of bubbles.

Next, as shown in FIG. 28(*e*), an alignment between the barrier pattern of the parallax barrier element 10 and the pixel pattern of the liquid crystal display panel 20 is carried out. For example, this alignment can be performed by recognizing, with a camera, alignment markers which were formed in advance on the transparent substrate 3 of the parallax barrier element 10 and on the liquid crystal display panel 20.

Thereafter, the resin layer 5 is cured by a predetermined method, whereby the attachment is completed. In the case where an ultraviolet-curing type adhesive is used as the material of the resin layer 5, as shown in FIG. 28(*f*), curing may be performed by an ultraviolet irradiation. Visible light may be irradiated in the case where a visible-light-curing type adhesive is used as the material of the resin layer 5. A heat treatment may be performed in the case where a thermosetting type adhesive is used.

FIGS. 28(*a*) to (*f*) show an attachment method in the case where the resin layer 5 is provided in contact with the lenses 4. In the case where the air layer 6 is provided instead of the resin layer 5, the attachment can be carried out through steps shown in FIGS. 29(*a*) to (*f*), for example.

Figure 29:
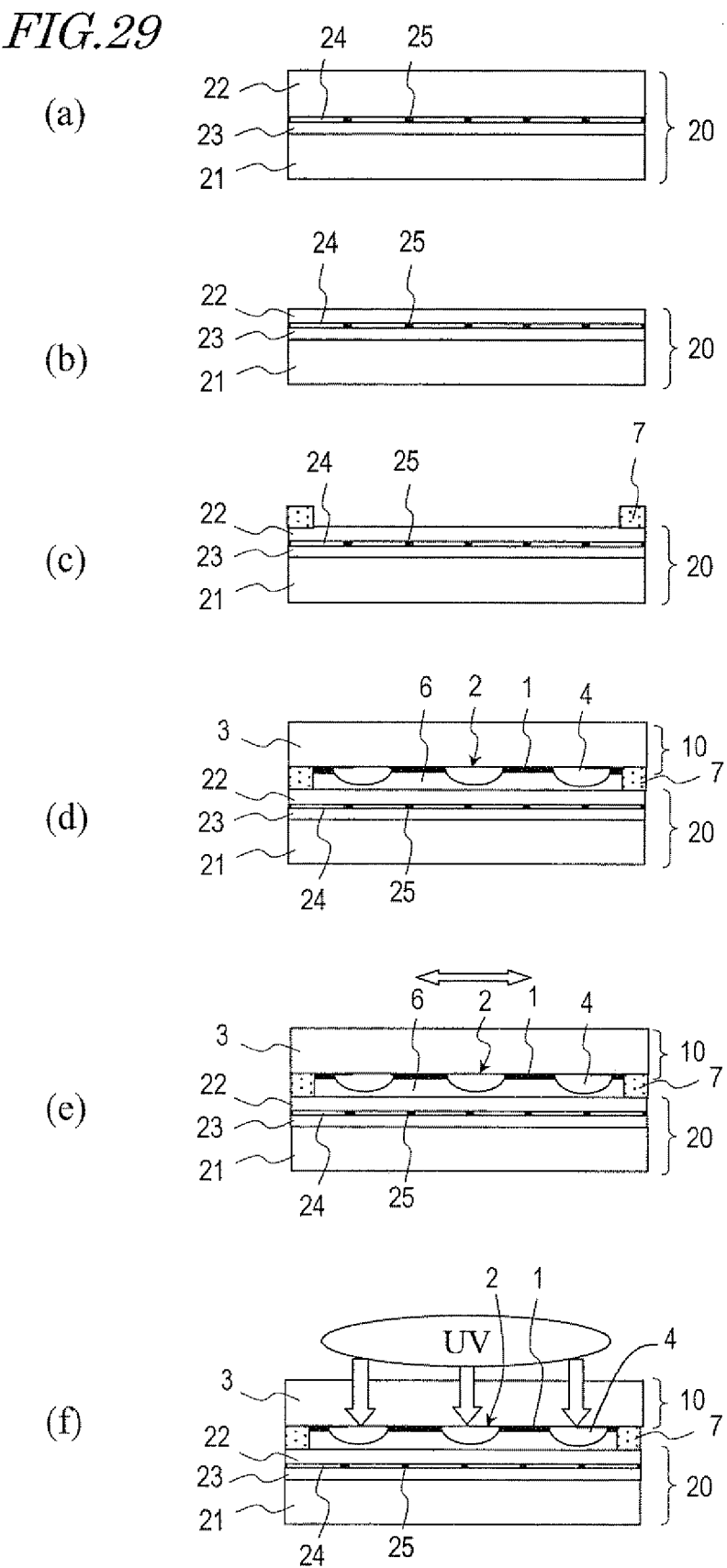
FIG. 29 (a) to (f) are step-by-step cross-sectional views schematically showing a step of attaching a parallax barrier element and a liquid crystal display panel.

First, the liquid crystal display panel 20 as shown in FIG. 29(*a*) is provided, and as shown in FIG. 29(*b*), the color filter substrate 22 of the liquid crystal display panel 20 is made thin by chemical etching or grinding.

Next, as shown in FIG. 29(*c*), a frame-like sealing member 7 is formed on the color filter substrate 22. As the material of the sealing member 7, an ultraviolet-curing type adhesive, a visible-light-curing type adhesive, a thermosetting type adhesive, or the like can be used. Although the sealing member 7 is formed on the color filter substrate 22 of the liquid crystal display panel 20 herein, the sealing member 7 may alternatively be formed on the transparent substrate 3 of the parallax barrier element 10.

Then, as shown in FIG. 29(*d*), the liquid crystal display panel 20 and the parallax barrier element 10 are attached via the resin layer 5. This attachment may be carried out in a vacuum, or in the atmospheric air or under a reduced pressure.

Next, as shown in FIG. 29(*e*), an alignment between the barrier pattern of the parallax barrier element 10 and the pixel pattern of the liquid crystal display panel 20 is carried out, and thereafter the sealing member 7 is cured by a predetermined method, whereby the attachment is completed. In the case where an ultraviolet-curing type adhesive is used as the material of the sealing member 7, for example, the curing may be carried out through an ultraviolet irradiation, as shown in FIG. 29(*f*).

Figure 30:
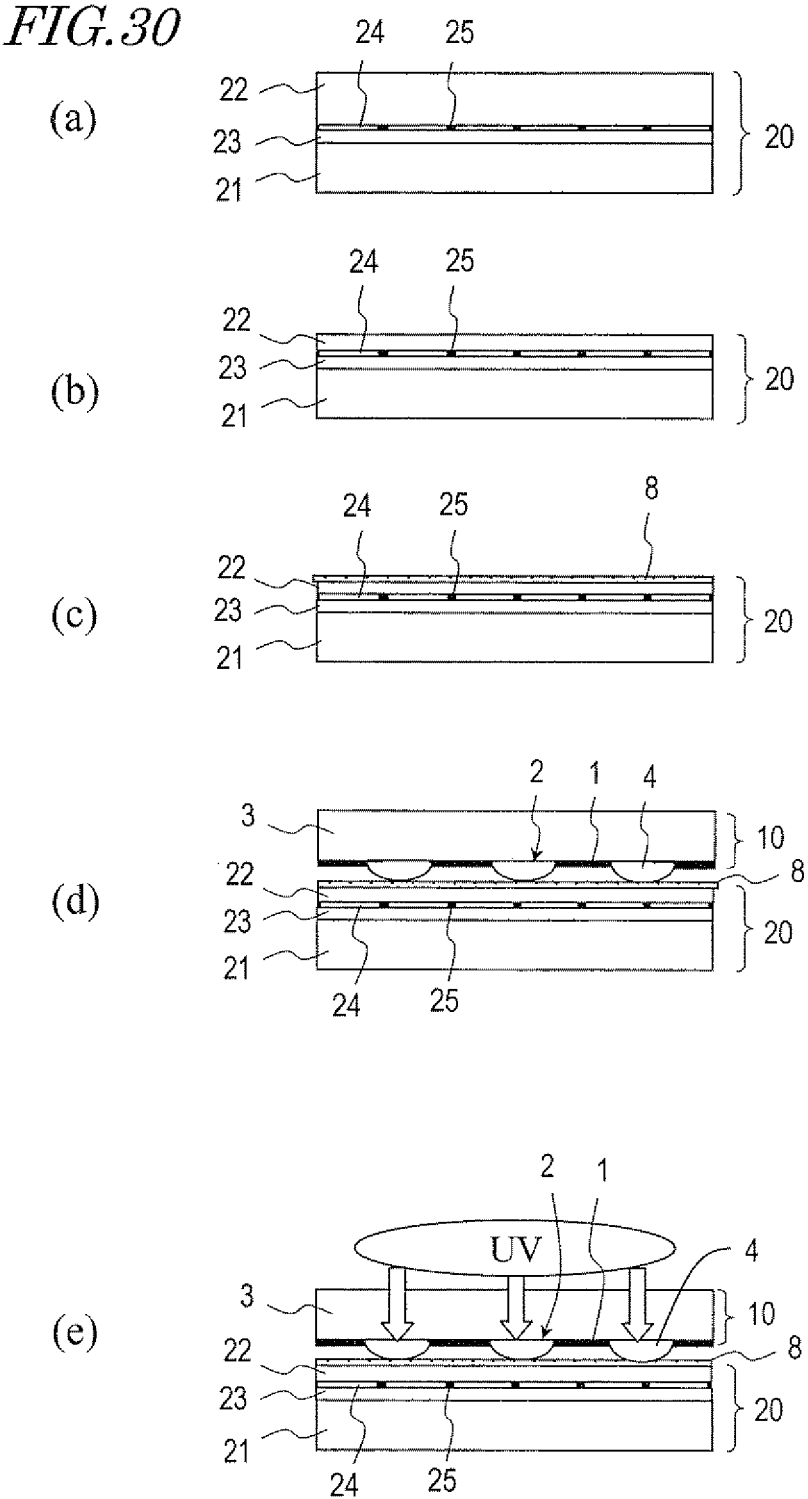
FIG. 30 (a) to (e) are step-by-step cross-sectional views schematically showing a step of attaching a parallax barrier element and a liquid crystal display panel.

Alternatively, the attachment may be carried out through steps shown in FIGS. 30(*a*) to (*e*).

First, the liquid crystal display panel 20 as shown in FIG. 30(*a*) is provided, and as shown in FIG. 30(*b*), the color filter substrate 22 of the liquid crystal display panel 20 is made thin by chemical etching or grinding.

Next, as shown in FIG. 30(*c*), a double-faced tape 8 is attached onto the color filter substrate 22. The double-faced tape 8 may be of a sticking-type or an adhesive-type.

Then, as shown in FIG. 30(*d*), the liquid crystal display panel 20 and the parallax barrier element 10 are attached via the resin layer 5. This attachment may carried out in a vacuum, or in the atmospheric air or under a reduced pressure. Note that, in the case of employing the double-faced tape 8, it is preferable to carry out the alignment between the barrier pattern and the pixel pattern before the attachment, because the alignment cannot be carried out after the attachment.

Thereafter, the double-faced tape 8 is allowed to cure as necessary, whereby the attachment is completed. In the case of employing an ultraviolet-curing type double-faced tape 8, curing may be carried out through an ultraviolet irradiation, as shown in FIG. 30(*e*). In the case of employing a thermosetting type double-faced tape 8, a heat treatment may be performed. In the case of employing a sticking-type double-faced tape 8, no curing treatment is need at all.

Next, examples of the arrangement of pixels of the liquid crystal display panel 20 and the arrangement of the barrier pattern of the parallax barrier element 10 will be described. FIGS. 31(*a*), (*b*), and (*c*) show preferable exemplary arrangements. FIG. 31(*a*) shows an arrangement of pixels (color filter arrangement) of the liquid crystal display panel 20; FIG. 31(*b*) shows an arrangement of the light-shielding portions 1, the light-transmitting portions 2, and the lenses 4 of the parallax barrier element 10; and FIG. 31(*c*) shows them as being overlaid on each other.

In the example shown in FIG. 31(*a*), the plurality of pixels P1 belonging to the first group of pixels and the plurality of pixels P2 belonging to the second group of pixels are disposed in the form of stripes each extending along a column direction, such that the pixels P1 and the pixels P2 are alternately positioned along the row direction. Correspondingly to this, the plurality of light-shielding portions 1 and light-transmitting portions 2 and the lenses 4 of the parallax barrier element 10 are arranged in stripes, as shown in FIGS. 31(b) and (c).

FIGS. 32(a), (b), and (c) show another exemplary preferable arrangement. In the example shown in FIG. 32(a), the pixels P1 belonging to the first group of pixels and the pixels P2 belonging to the second group of pixels are alternately positioned along the row direction and alternately positioned also along the column direction. In other words, the pixels P1 and the pixels P2 are each disposed in a staggered manner. Correspondingly to this, the plurality of light-shielding portions and light-transmitting portions 2 and the lenses 4 of the parallax barrier element 10 are arranged in a staggered manner, as shown in FIGS. 32(b) and (c).

Figure 33:
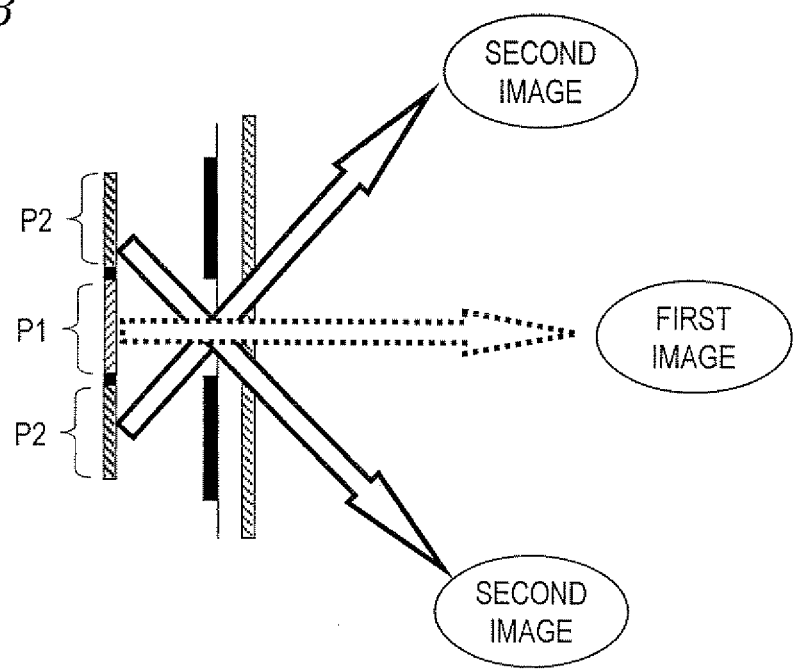
FIG. 33 A diagram for describing a phenomenon which occurs when adopting the arrangement shown in FIG. 32.

Either one of the stripe arrangement shown in FIG. 31 or the staggered arrangement shown in FIG. 32 may be used. When the staggered arrangement shown in FIG. 32 is used, the pixels are positioned in delta fashion, so that a finer image display is possible. However, when a staggered arrangement is used, the light-shielding portions 1 and light-transmitting portions 2 are alternately positioned not only along the horizontal direction but also along the vertical direction (the direction shown by an arrow in FIG. 32(c)), so that the images are separated not only along the horizontal direction but also along the vertical direction. Therefore, for example, if a viewer who is observing the first image in the frontal direction moves his or her head along the vertical direction, as shown in FIG. 33, the second image will be observed. In other words, when a staggered arrangement is used, the viewing range along the vertical direction will be restricted. When the stripe arrangement shown in FIG. 31 is used, such a phenomenon will not occur, and the viewing range along the vertical direction will not be restricted.

Figure 34:
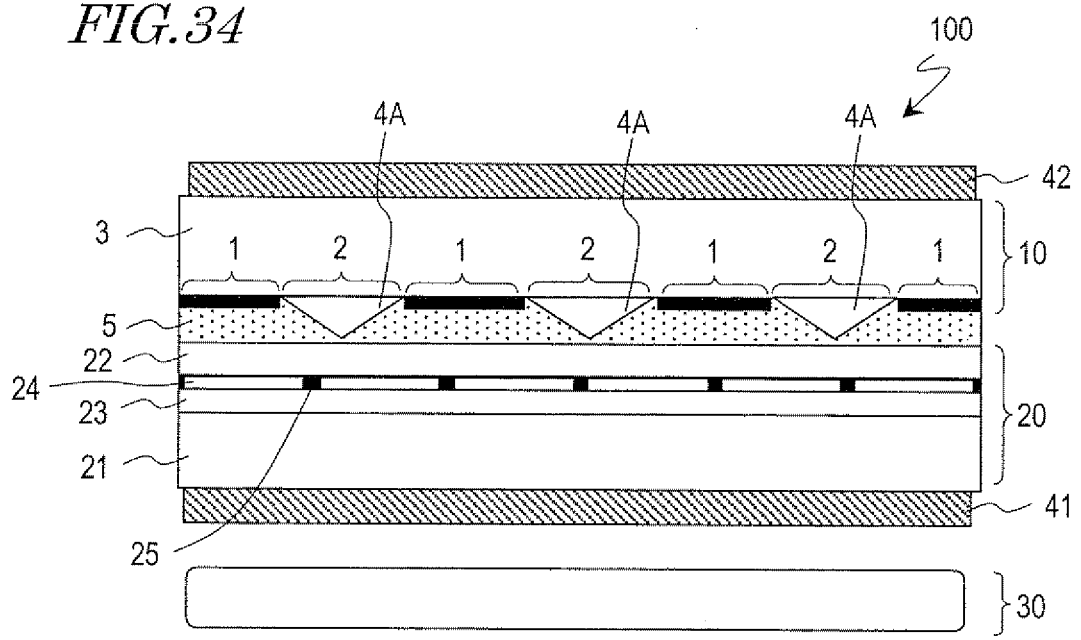
FIG. 34 A cross-sectional view schematically showing the image display device 100 according to a preferred embodiment of the present invention.
Figure 35:
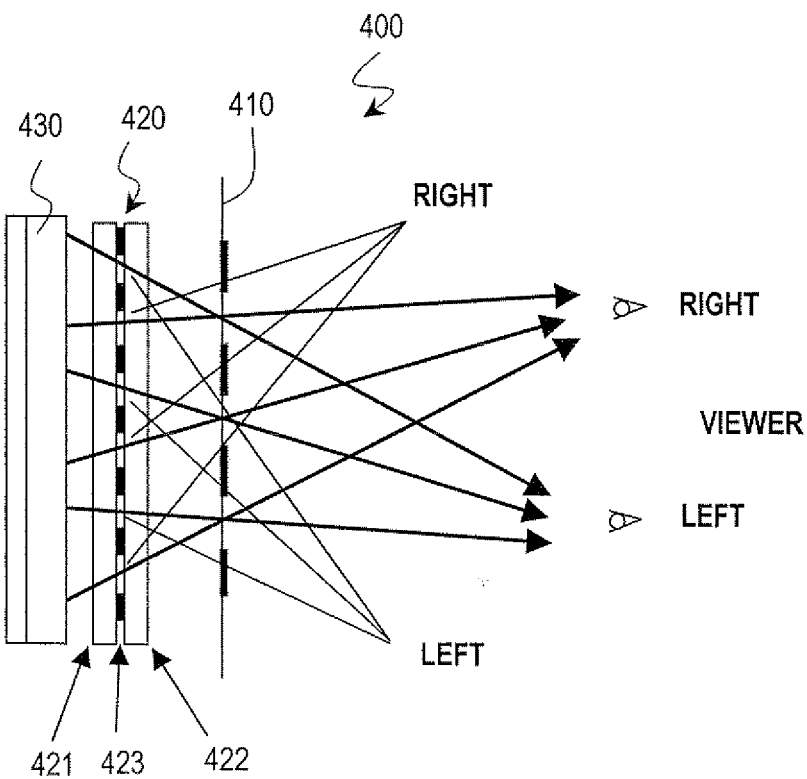
FIG. 35 A cross-sectional view schematically showing a stereoscopic image display device 400.
Figure 36:
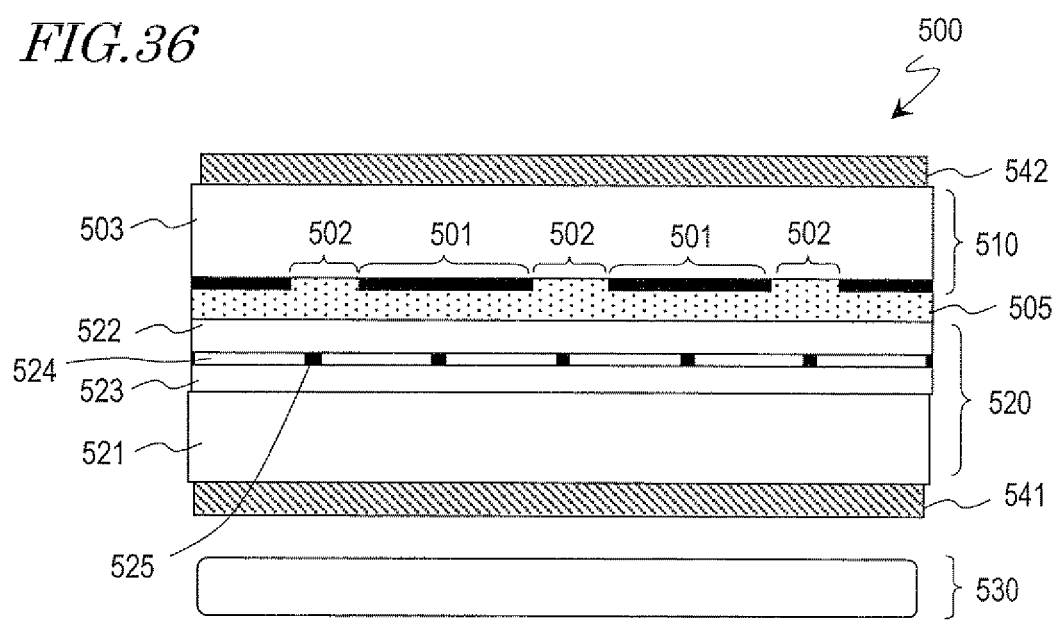
FIG. 36 A cross-sectional view schematically showing a dual-view display device 500.

Although the present embodiment illustrates the lenses 4 which are in the shape of curved surfaces as converging elements, the converging elements are not limited thereto. Similar effects can be obtained by providing on the light-transmitting portions 2 elements which have a convergence function. The "lenses" to be used as the converging elements only need to be lenses in the broad sense. Other than the lenses 4 in the shape of curved surfaces as shown in FIG. 1 (i.e., lenses in the narrow sense), prisms 4A as shown in FIG. 34 may be used. The lenses 4 in the shape of curved surfaces have a stronger convergence action than do the prisms 4A, which are composed of a plurality of planes, and therefore are likely to realize a high luminance while maintaining a broad viewing range.

Moreover, although the present embodiment illustrates the liquid crystal display panel 20 as a display panel, the display panel is not limited to a liquid crystal display panel. As the display panel, various display panels can be used, and a self-light-emitting type display panel which does not require a backlight may be used, e.g., an organic EL display panel.

Moreover, the present invention is suitably used not only for the illustrated dual-view display device, but also for a stereoscopic image display device. Also in a stereoscopic image display device having a parallax barrier element, a bright display with a broad viewing range will be realized by providing converging elements in the light-transmitting portions. In a stereoscopic image display device, the first image to be displayed by the first group of pixels will be an image for the right eye, and the second image to be displayed by the second group of pixels will be an image for the left eye.

INDUSTRIAL APPLICABILITY

According to the present invention, a bright display with a broad viewing range can be realized in an image display device having a parallax barrier element. An image display device according to the present invention is suitably used for various electronic apparatuses such as car navigation systems.

The invention claimed is:
1. An image display device comprising:
a display panel having a first group of pixels for displaying a first image and a second group of pixels for displaying a second image; and
a parallax barrier element for separating display light emitted from the first group of pixels and display light emitted from the second group of pixels, the parallax barrier element including a plurality of light-shielding portions and a plurality of light-transmitting portions which are alternately positioned within a same plane, wherein,
the parallax barrier element includes converging elements respectively provided for the plurality of light-transmitting portions,
said converging elements are lenses each including (i) a curved side and (ii) a substantially flat side, and wherein the curved side faces a backlight of the display device and the substantially flat side faces a viewer of the display device; and
a resin layer which is in contact with a surface of each lens that is closer to the display panel, wherein, a refractive index of the lenses and a refractive index of the resin layer are different, wherein the refractive index of the lenses is higher than the refractive index of the resin layer; and wherein a thickness of the resin layer is greater than a thickness of the lenses.
2. The image display device of claim 1, wherein the resin layer is made of an ultraviolet-curing type adhesive, a visible-light-curing type adhesive, or a thermosetting type adhesive.
3. The image display device of claim 1, further comprising an air layer which is in contact with a surface of each lens that is closer to the display panel.
4. The image display device of claim 1, wherein the lenses are convex lenses having a predetermined radius of curvature.
5. The image display device of claim 4, wherein the convex lenses are lenticular lenses.
6. The image display device of claim 1, wherein the plurality of light-shielding portions and the plurality of light-transmitting portions are arranged in stripes.
7. The image display device of claim 1, wherein the plurality of light-shielding portions and the plurality of light-transmitting portions are arranged in a staggered manner.
8. The image display device of claim 1, wherein the display panel is a liquid crystal display panel including a liquid crystal layer.
9. An electronic apparatus comprising the image display device of claim 1.
10. The electronic apparatus of claim 9 being a car navigation system.

* * * * *

UNITED STATES PATENT AND TRADEMARK OFFICE
CERTIFICATE OF CORRECTION

PATENT NO.         : 8,687,273 B2                                    Page 1 of 1
APPLICATION NO.    : 12/440146
DATED              : April 1, 2014
INVENTOR(S)        : Fukushima et al.

It is certified that error appears in the above-identified patent and that said Letters Patent is hereby corrected as shown below:

On the title page, please add:

item -- (30) Foreign Application Priority Data

Sep. 7, 2006 (JP) .....................2006-243348 --.

Signed and Sealed this
Twenty-second Day of July, 2014

Michelle K. Lee
*Deputy Director of the United States Patent and Trademark Office*